United States Patent [19]

Schmidt

[11] Patent Number: 6,003,023

[45] Date of Patent: Dec. 14, 1999

[54] INCREMENTAL CHANGE PROCESSING APPARATUS FOR PRESENTED OBJECTS

[75] Inventor: William Jon Schmidt, Rochester, Minn.

[73] Assignee: International Business Machines Corporation, Armonk, N.Y.

[21] Appl. No.: 08/823,593

[22] Filed: Mar. 25, 1997

Related U.S. Application Data

[62] Division of application No. 08/334,479, Nov. 4, 1994, abandoned.

[51] Int. Cl.[6] .................................................. G06F 17/30
[52] U.S. Cl. ............................ 707/3; 707/500; 707/533
[58] Field of Search ............................ 364/900, 419; 707/100, 101, 102, 200

[56] References Cited

U.S. PATENT DOCUMENTS

| | | | |
|---|---|---|---|
| 4,456,969 | 6/1984 | Herzik et al. | 364/900 |
| 4,730,252 | 3/1988 | Bradshaw | 364/403 |
| 4,787,059 | 11/1988 | Yoshimura | 364/900 |
| 4,814,988 | 3/1989 | Shiotani et al. | 364/419 |
| 4,827,447 | 5/1989 | Croes et al. | 364/900 |
| 4,881,197 | 11/1989 | Fischer | 364/900 |
| 4,974,195 | 11/1990 | Amari et al. | 364/900 |
| 5,013,167 | 5/1991 | Ervin et al. | 400/63 |
| 5,111,413 | 5/1992 | Lazansky et al. | 364/578 |
| 5,315,703 | 5/1994 | Matheny et al. | 395/164 |
| 5,317,732 | 5/1994 | Gerlach, Jr. et al. | 395/600 |
| 5,390,330 | 2/1995 | Talati | 395/700 |
| 5,392,386 | 2/1995 | Chalas | 395/155 |
| 5,604,897 | 2/1997 | Travis | 395/795 |
| 5,761,689 | 6/1998 | Rayson et al. | 707/533 |

OTHER PUBLICATIONS

Barbara Assadi, "WordPerfect for the Mac sports powerful capabilities", InfoWorld, v13, p. 77, Mar. 4, 1991.

Margaret Levine Young and David C. Kay, "WordPerfect For Windows For Dummies 2nd Edition", IDG Books WorldWide, Inc., pp. 91–102, 1994.

Hyphenation Help File from Microsoft Word for Windows, Version 6.0, Copyright 1983–1993.

Primary Examiner—Wayne Amsbury
Assistant Examiner—Cheryl R. Lewis
Attorney, Agent, or Firm—Steven W. Roth

[57] ABSTRACT

Historically, graphics editors, text editors, presentation editors, and word processors provide a number of special processing functions that operate on a presented object as a whole. For word processors, these special functions might include: spelling checks, style (grammar) checks, hyphenation, and pagination. The present invention provides a transparent mechanism for making these special processing functions incremental, in the sense that the mechanisms re-process only those portions of presented objects that have changed since the last time the function was performed.

42 Claims, 32 Drawing Sheets

FIG. 2B

208 — Traitor, now is thy death-day come. And when Sir Mordred saw King Arthur, he ran until him with his sword drawn in his hand, and there King Arthur smote Sir Mordred under the shield, with a foin of his spear, throughout the body, more than a fathom. And when Sir Mordred felt that he had his death wound he thrust himself with the might that he had up to the burr of King Arthur's spear, and right so he smote his father, King Arthur, with his sword holden in both his hands, on the side of the head, that the sword pierced the helmet and the brain-pan. And therewith Mordred dashed down stark dead to the earth.

210 — And the noble King Arthur fell in a swoon to the earth, and there he swooned ofttimes, and Sir Lucan and Sir Bedivere ofttimes heaved him up. And so weakly betwixt them they led him to a little chapel not far from the sea, and when the King was there he thought him reasonably eased.

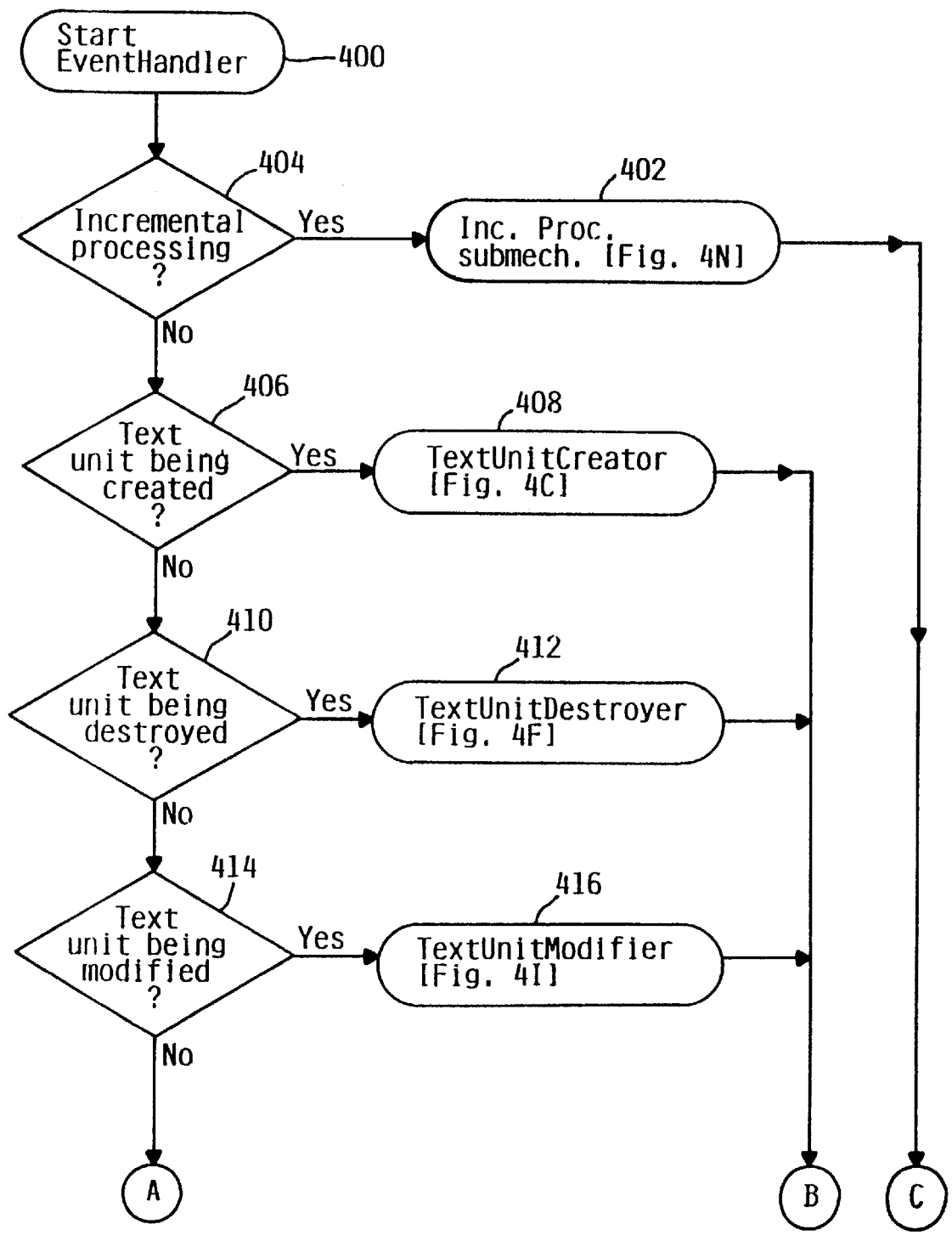
FIG. 4B-I

INCREMENTAL CHANGE PROCESSING APPARATUS FOR PRESENTED OBJECTS

This is a divisional of application Ser. No. 08/334,479 filed on Nov. 4, 1994, abandoned.

FIELD OF THE INVENTION

The present invention relates to data processing systems. More particularly, the present invention relates to the processing of presented objects.

BACKGROUND OF THE INVENTION

The EDVAC computer system of 1948 is cited by many as the dawn of the computer era. In the years since 1948, use of computers has proliferated to the extent that they have found their way into most every aspect of day to day life. The primary reason for this proliferation is the fact that computer systems are now used to perform many of the tasks that used to be performed by hand or with the aid of crude devices. Drawing pictures and composing letters and documents are two tasks which are now performed more efficiently with computer systems. In the past, drawing pictures and composing documents had been done through the use of paper and pencil, or possibly, through the use of a typewriter. Today, tools such as graphics editors and word processors allow computer system users to draw pictures, create presentations, and compose letters and documents much more quickly and efficiently.

Present day tools are able to perform these tasks much more speedily and efficiently because of two fundamental advancements. First, making changes to drawings and documents is much easier with tools such as graphics editors and word processors because drawings and documents are stored in electronic form inside the computer system's memory instead of on paper or some other limited media Accordingly, the computer system user does not need to make messy erasures or redraw or retype entire portions of drawings and documents. Instead, the user need only retrieve the item from the computer system's memory, make the necessary change to the electronic representation of the item, and place the item back in memory.

The second fundamental advancement is the provision of special processing functions. Beyond providing basic editing capability (i.e., the ability to create, modify, store, and output drawings and documents), present day tools often provide special processing functions such as: automatic pagination, grammar checking, automatic hyphenation, and spell checking. These special processing functions further enhance efficiency by automating subtasks that would otherwise need to be performed manually. Spell checking, for example, is now done with the click of a button instead of by a manual, dictionary assisted, word by word review.

The problem with many of these special processing functions, though, is that they tend to be slow and unintelligent, particularly with drawings and documents that involve many pages. For example, spell checking features (called spell checkers) are often exceedingly slow because they operate by repeatedly rechecking the entire document for spelling mistakes. While this is typically not a problem for small documents that are a page or two in length, it can be an excruciating task for medium to large size documents. Some tools attempt to resolve this problem by providing the user with the ability to select a portion of the drawing or document upon which the special processing function will operate. This approach is helpful to the user because the user is not forced to go through the entire drawing or document each time one of these special processing functions is needed. However, the ability to select portions of drawings and documents can be considered only a partial solution at best. Even if the tool allows the user to select portions of drawings and documents at a very fine grain (e.g., on a word by word basis in the case of a word processor), the tool is still requiring the user to remember (or at least decide) what portion to select Further, the user may want a special processing function to operate on several, non-adjacent portions of a drawing or document If this is the case, the user must not only remember the relative location of all the portions to be selected, but the user must also select each portion one at a time. Naturally, this can be an extremely frustrating and time consuming experience.

Without an enhancement that adds intelligence and saves user time, these special processing functions will continue to limit the productivity gains that many computer based tools are designed to provide.

SUMMARY OF THE INVENTION

It is, therefore, a principal object of this invention to provide an enhanced computer system that processes presented objects incrementally.

It is another object of this invention to provide an enhanced method and apparatus for incremental processing of presented objects.

It is still another object of this invention to provide an enhanced method and apparatus for incremental processing of special processing functions within a word processing mechanism.

These and other objects of the present invention are accomplished by the presented object processor disclosed herein.

Graphics editors, text editors, presentation editors, and word processors are examples of present day tools that operate on presented objects. Historically, many of these tools provide a number of special processing functions that operate on a presented object as a whole. An example list of these special functions for word processors might include: spelling checks, style (grammar) checks, hyphenation, and pagination. The present invention provides a transparent mechanism for making these special processing functions incremental, in the sense that the mechanisms re-process only those portions of presented objects that have changed since the last time the function was performed.

The mechanism of the present invention utilizes a system of hierarchical change flags to provide intelligent incremental processing of presented objects. The change flags are stored in a balanced tree designed to have minimal depth so as to limit the processing overhead. A tree is a common data structure used in computer systems, and is analogous to the trees found in nature. That is, a tree starts with a "root" (which is like a natural tree's trunk) which is then subdivided into large branches. These are in turn subdivided into smaller branches, and so forth, until the leaves are reached. The leaves are not subdivided, and terminate the tree. In a tree data structure, the branching points (at which a larger branch is subdivided into smaller ones) are called "nodes."

In a natural tree, all leaves that can be reached by moving outward along a particular branch (and its sub-branches) may be considered to be owned by that branch. In this sense, the trunk owns all the leaves of the tree. Similarly, in a tree data structure a node is considered to own all of the leaves that can be reached by following branches out of that node. These leaves are called the node's "descendants." Since all leaves are descendants of the root, the root owns all the leaves in the tree.

In the present invention, each leaf of the balanced tree contains a number of "entries," each of which corresponds to one incremental unit in the presented object (e.g., drawing or document). An incremental unit is the smallest entity that can be processed separately by a special processing function. The makeup of an incremental unit is designed to be flexible so that it can be applied equally to different tools and different tool implementations. For example, the incremental unit in a word processor might be a sentence or paragraph, while the incremental unit in a graphics editor might be a figure or geometric object.

Together, the leaves of the balanced tree contain one entry for each incremental unit in the presented object. Each entry in the leaves of the balanced tree identifies the location of the corresponding incremental unit in the presented object, and also contains a set of change flags. There is one flag per entry for each special processing function that will be processed incrementally. For example, if a word processor is to perform incremental spell-checking and hyphenation of paragraphs, then there will be two flags stored in each leaf entry. Each flag is in one of two states: a flag is "set" (i.e., logical 1) if the incremental unit specified by that entry has been modified since the last time the given special processing function was executed, and is "cleared" (i.e., logical 0) otherwise. In other words, the flags identify those incremental units for which the function should be executed the next time the function is selected by the user.

It is important to understand that the hierarchical change flag tree of the present invention is specifically organized in a way that allows the mechanism of the present invention to quickly locate the incremental units that require processing. Each node in the tree summarizes the information for all of the leaves that are its descendants. If any one of the leaves which descend from a node (referred to as the ancestor node of the leaf) contains an entry for an incremental unit whose change flag for a special processing function is set, then that change flag is also set in the ancestor node. If none of the node's descendant leaves have the change flag set, then neither does the ancestor node.

Given this organization, a special processing function can examine the tree, starting with the root node. If the change flag for the special processing function is not set in the root, this indicates that no incremental units need to be processed. Otherwise, the child nodes of the root are examined to see if their change flags for the special function are set. Whenever a node is found whose change flag is not set, all of the children of that node are skipped, since none of the incremental units below that node require special processing. That is, the search for incremental units requiring processing is performed by "pruning" the tree of branches where no processing is needed. When the leaves are reached in this search, the special processing function is applied only to those incremental units whose entries in the leaves have the change flag set.

It is important to understand that the change flag tree is implemented as a persistent data structure. A persistent data structure is a representation of data that remains in existence even after the application program that created it has terminated. By using this type of data structure, both the presented object and its associated change flag tree still reside on the disk after processing terminates. In the case of a word processor, persistence allows the user to only proofread those paragraphs added or changed since the last proofreading, regardless of how many times the word processor has been invoked during the interval.

As an example of the utility of the change flags tree, suppose that a user of a word processor has written a large document containing 4000 paragraphs, and that each paragraph constitutes one incremental unit The user has completely spell-checked the document on a previous day, and saved the corrected document to persistent storage. At a later time, the user reopens the document and changes the 100th, 1000th, and 3000th paragraphs and makes no other changes. Now suppose that the user wants to check the spelling of the document again. Using prior art technology, the user must either remember and highlight each of the modified paragraphs (a difficult and tedious process at best), or invoke the spell checker for the entire document. This would require checking the spelling of all words in all 4000 paragraphs.

Now, if the user's word processor incorporated the incremental processing features of the present invention, the user would not have to remember which paragraphs were modified, but would simply invoke the incremental spell checker. As discussed below in the section entitled "Performance Notes," a hierarchical change flags tree for a document containing 4000 paragraphs would typically consist of only two levels: the root node and the level containing the leaves. In order to provide the user with a correctly spelled document, the incremental spell checker would only have to visit the root and three leaf nodes, and would only check spelling of words in the three modified paragraphs. Supposing that the time required to process a node in the change flags tree is roughly equal to the time required to check the spelling of a paragraph, the incremental processing feature would save $(4000-7) \div 4000 = 99.83\%$ of the processing time required by the nonincremental method.

BRIEF DESCRIPTION OF THE DRAWINGS

FIGS. 3A through 3J show representative diagrams and details of the data structures used in the preferred embodiment of the present invention.

DETAILED DESCRIPTION

Figure 1:
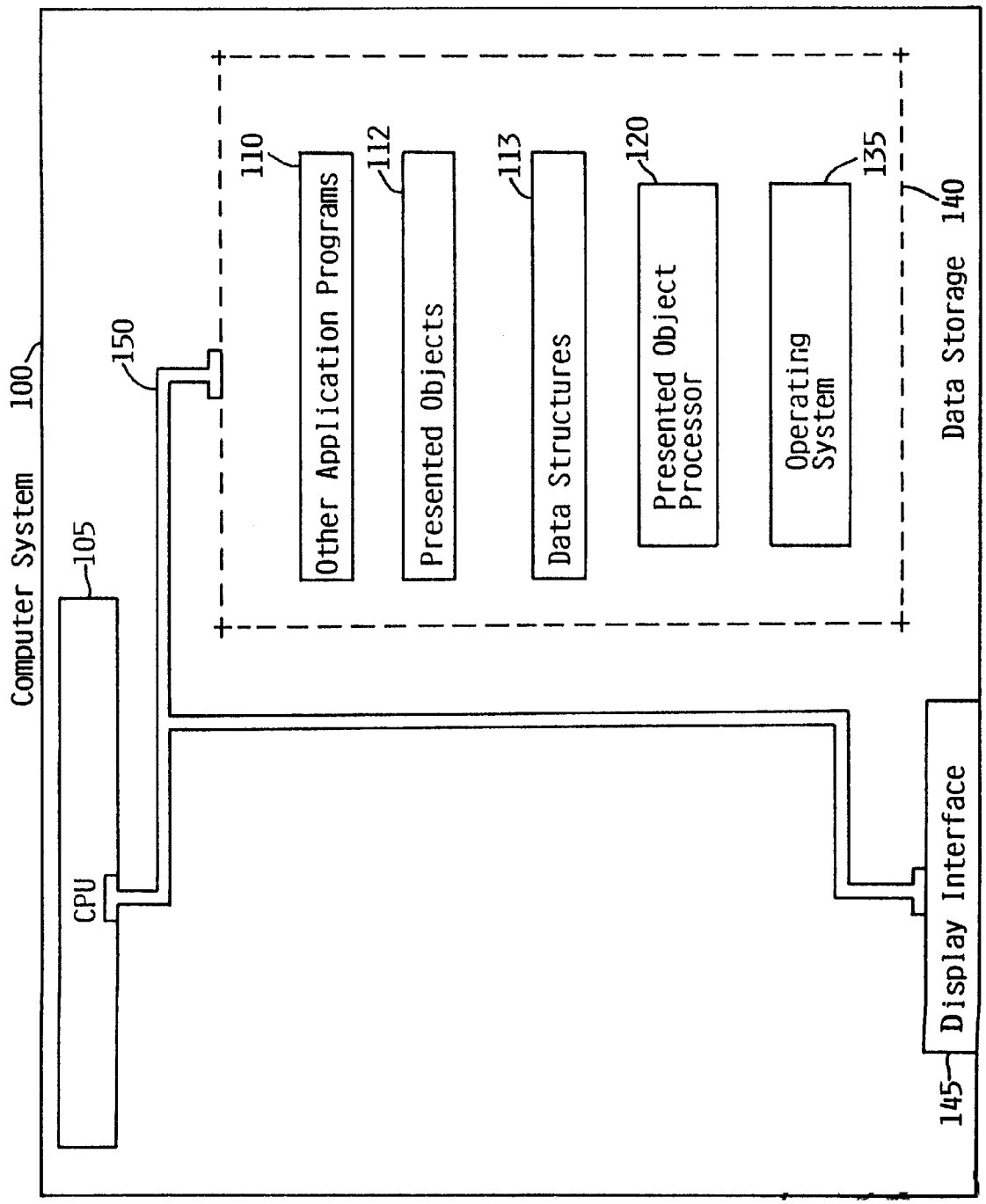
FIG. 1 shows the computer system of the present invention.
Figure 2A:
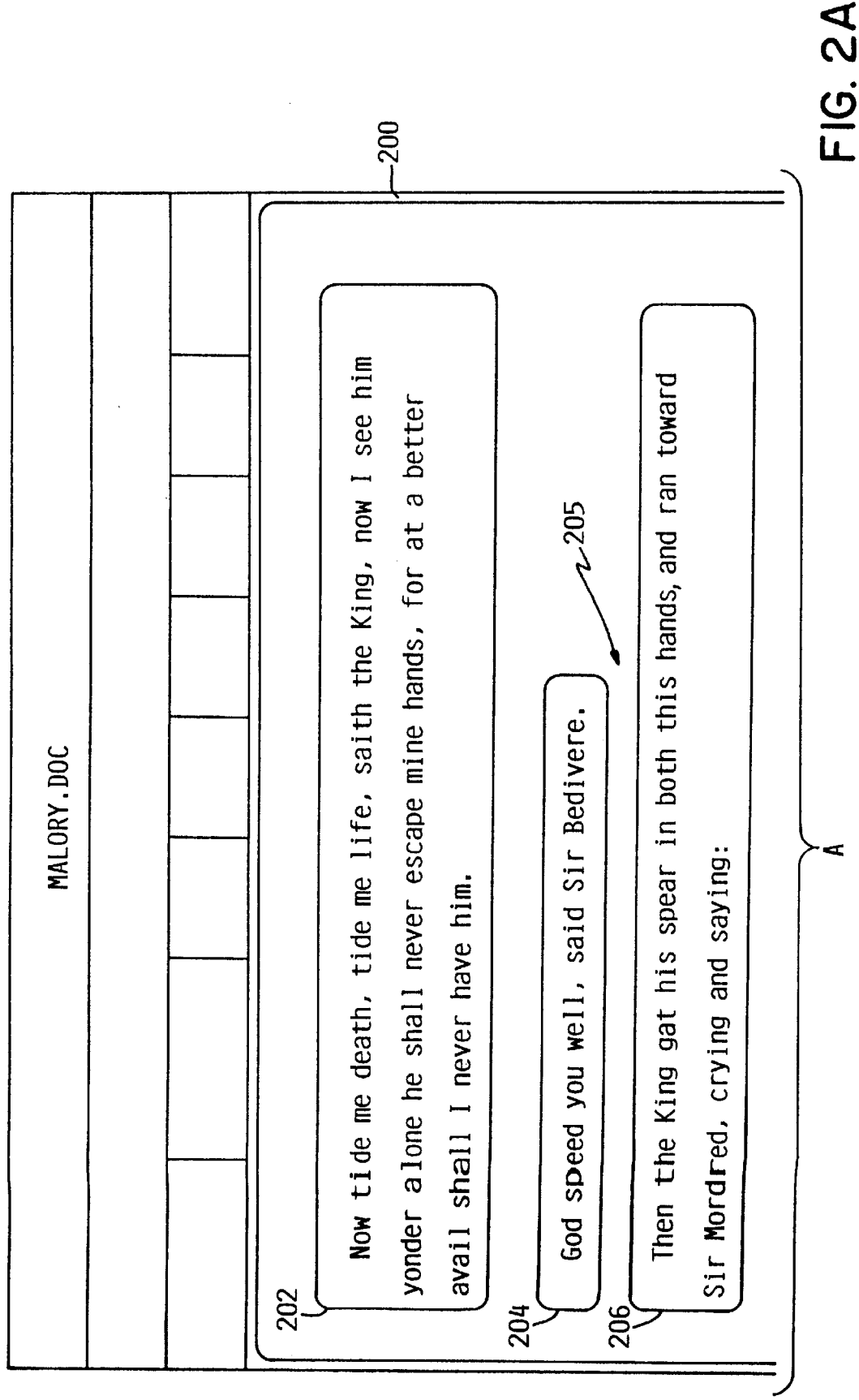
FIG. 2 shows text within a document being edited by a word processor or other publishing system.

FIG. 1 shows a block diagram of the computer system of the present invention. The computer system of the preferred embodiment is an enhanced Personal System/2 personal computer system. However, most any computer system could be used. As shown in the exploded view of FIG. 1, computer system 100 comprises main or central processing unit (CPU) 105 connected to data storage 140 and display/keyboard interface 145 via system bus 150. Display/keyboard interface 145 allows users to communicate with computer system 100. Although the system depicted in FIG. 1 contains only a single main CPU and a single system bus, it should be understood that the present invention applies equally to computer systems having multiple main CPUs and multiple I/O buses. Similarly, although the bus of the preferred embodiment is a typical hardwired, multidrop bus, any connection means that supports bidirectional communication could be used.

Data storage 140 contains Other Application Programs 110, Presented Object Processor 120, Presented Objects 112, Data Structures 113 and Operating System 135. In the nomenclature of this invention, the term "presented object"

should be understood to mean any object that is somehow presented to the user of a computer system. As examples only, the term presented object includes: documents, drawings, presentations, and circuit diagrams that are visually, aurally, or tactually presented to a computer system user. Therefore, it will be understood by those skilled in the art that the present invention applies equally to the typical visual objects of today as well as to futuristic objects that are mechanically presented aurally or tactually by the computer system to the computer system user.

While data storage 140 is shown as a monolithic entity, it should be understood that it may comprise a variety of devices, and that all programs and files shown will not necessarily be contained in any one device. For example, portions of Other Application Programs 110 and Operating System 135 will typically be loaded into primary memory to execute, while source data files will typically be stored on magnetic or optical disk storage devices.

As stated above, the present invention applies equally to the processing of all types of presented objects; however for the purposes of explanation, the description of the preferred embodiment of the present invention will focus on the field of word processors. Any other device for editing incremental units of any type could have been chosen.

Figure 3A:
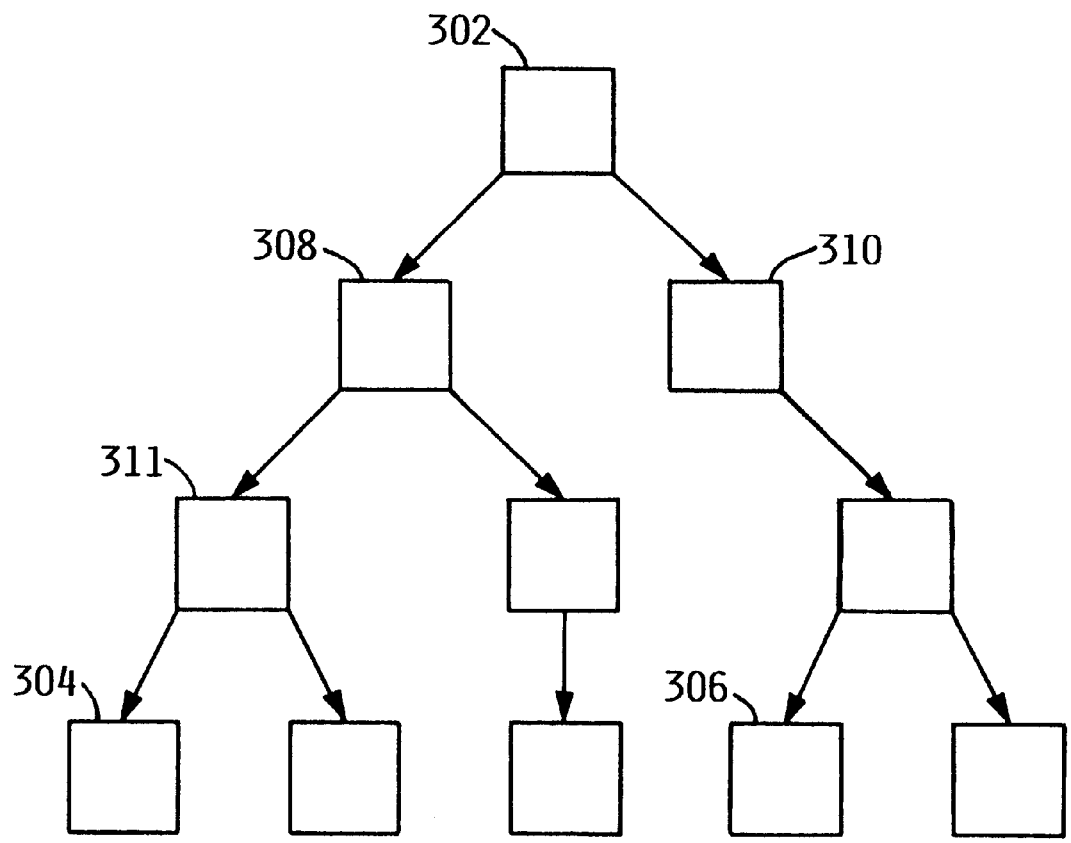
Figure 3B:
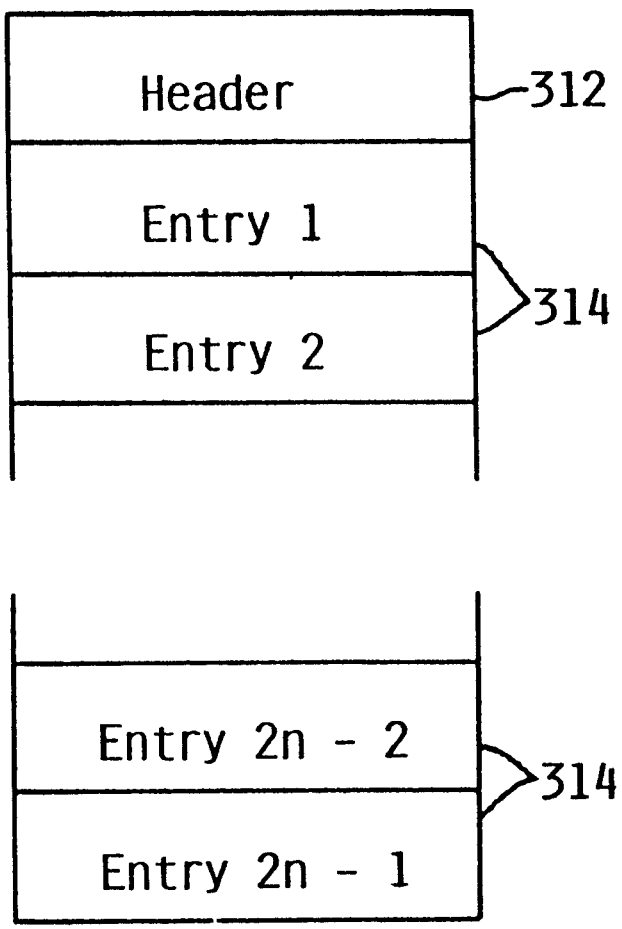
Figure 3C:
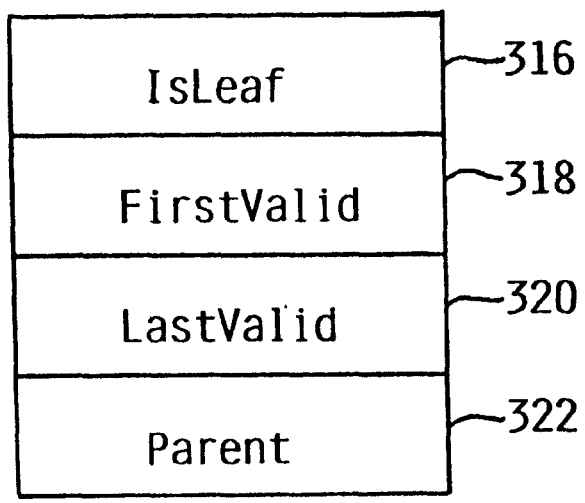
Figure 3D:
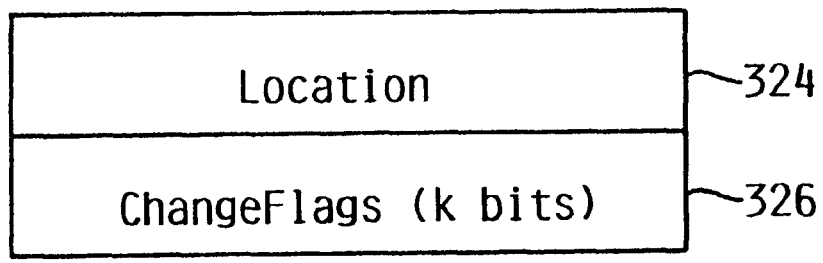
Figure 3E:
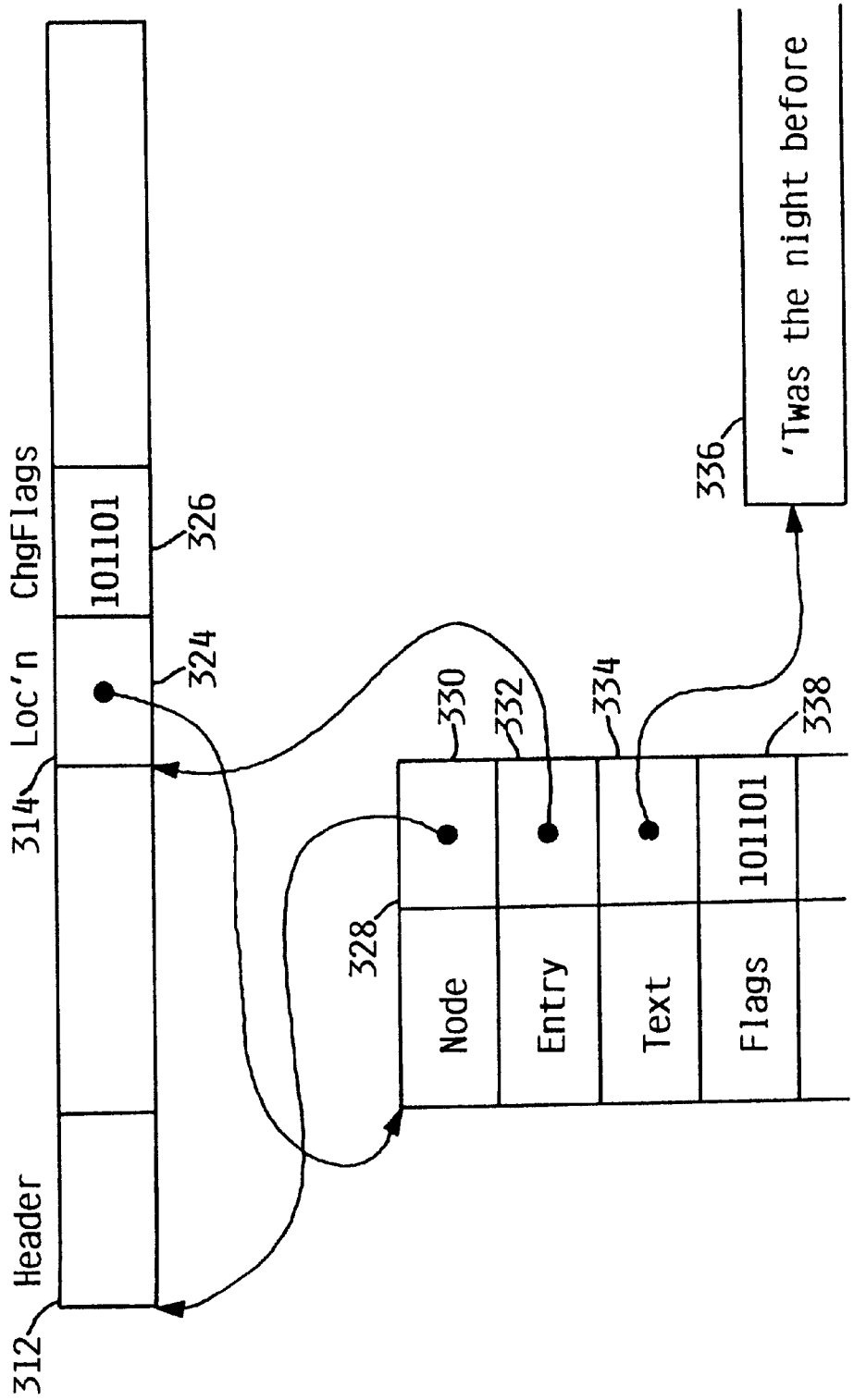
Figures 1, 3F:
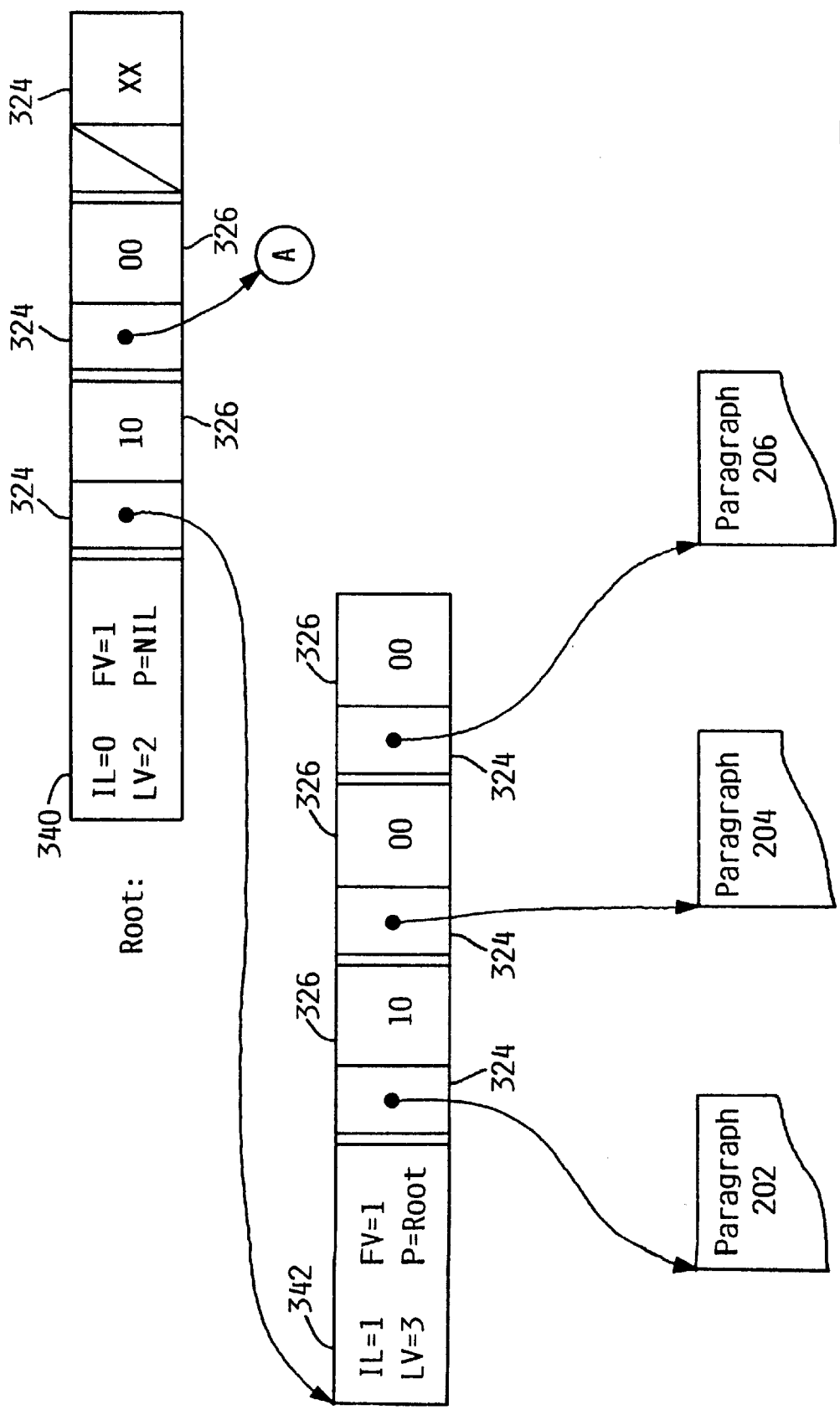
Figures 2, 3F:
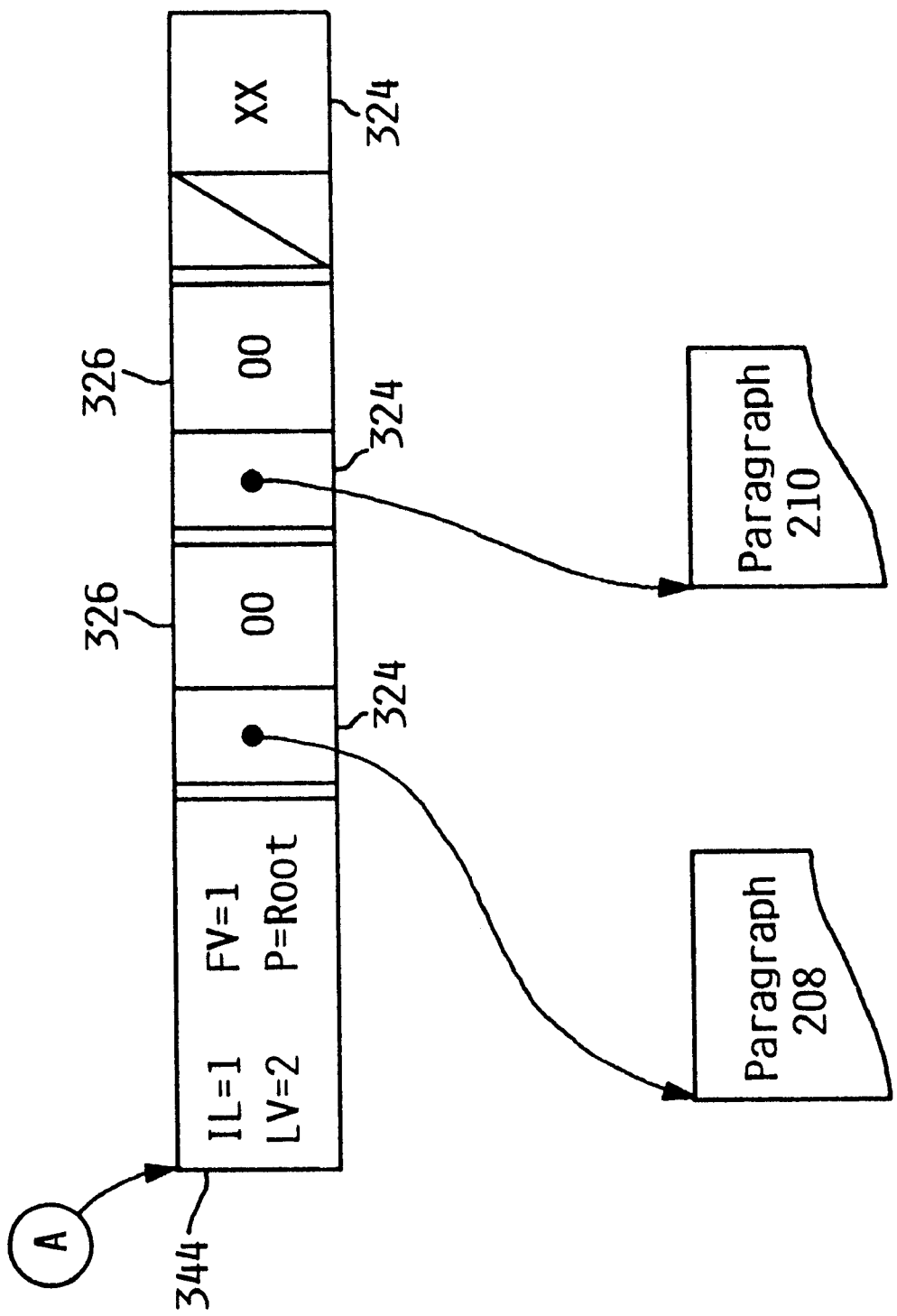

FIG. 2 shows the example document used throughout the description of the preferred embodiment to explain the present invention. As shown, document 200 contains a brief excerpt from Sir Thomas Malory's *Le Morte Darthur*, as translated in 1911 by A. W. Pollard. Also shown on FIG. 2 are paragraphs 202, 204, 206, 208, and 210. For purposes of the ensuing discussion, paragraphs have been chosen to represent the incremental units. Since the description of the preferred embodiment is focused on the field of word processors, the term "text units" will be used to refer to paragraphs as incremental units.

High-Level Overview

There are a number of special processing functions within word processors that can operate on a per-text-unit basis, and thus are candidates for incremental implementation using the mechanisms of the present invention. The following list is by no means exhaustive: spell checking; grammar checking; hyphenation; paragraph justification; paragraph flow; other formatting issues; and so on. In addition, there are other special processing functions, such as pagination, that seemingly are not candidates for application of the mechanisms of the present invention, since adding a paragraph changes the page breaks for the remainder of the document. However, hierarchical change flags can still save processing time for such functions, since it is only necessary to reprocess that portion of the document following the first modification. One can quickly find this location using the change flag tree, and then repaginate the remainder of the document.

The layout of the change flag tree is based in large part on the B-tree organization developed for storage and retrieval of ISAM (indexed-sequential access mode) database files by Bayer and McCreight in 1972. There are notable differences, however. The primary difference is that the change flag tree does not contain keys. Put another way, the change flag tree imposes only a sequential ordering on the text, rather than both indexed and sequential orderings as in the case of B-trees. And of course, B-tree nodes do not contain change flags that hierarchically summarize information about their children.

While those skilled in the art are familiar with balanced trees, the ensuing discussion establishes the terminology used throughout this description. A directed graph consists of a collection of nodes, together with directed edges from one node to another. An edge directed toward a node is an inedge for that node; an edge directed away from a node is an outedge for that node. A tree is a directed acyclic graph with a single node designated as the root such that the root has no inedges. The leaves of the tree are those nodes that have no outedges. A node is said to be an internal node if it is not a leaf. A path in the tree is a sequence of edges such that the destination of each edge (except the last) is the origin of the next edge on the path. The length of a path is the number of edges on the path. The height of a tree is the length of the longest path in the tree, i.e., the length of the longest path from the root to a leaf. A tree is said to be balanced if every path from the root to a leaf has the same length.

For example, consider the tree depicted in FIG. 3A. The squares in FIG. 3A represent nodes, and the arrows represent edges. Node 302 is the root of the tree. Nodes 304 and 306 are examples of leaves. Nodes 308 and 310 are examples of internal nodes. Note that root 302 is also an internal node by definition. An example of a path in this tree consists of nodes 302, 308, 311, and 304, together with the edges that connect them. The length of this path is 3. The height of the tree is 3, since there are no longer paths in the tree. This tree is balanced, since every path from root 302 to a leaf has the same length.

The change flag tree is implemented as a balanced tree. In the preferred embodiment, each node in the tree takes up exactly the amount of memory that can be stored in a single sector on the disk. (The term "disk" refers to any persistent storage device. The term "sector" refers to the smallest unit of data that the disk or other storage device can read or write in one operation.) The purpose of this is to minimize the number of accesses to disk, since disk access time is orders of magnitude greater than that of main memory. (Alternatively, the node size may be an exact multiple of the sector size, or the sector size may be an exact multiple of the node size. The exact mapping should be selected to maximize performance for the underlying machine architecture.)

Detailed Data Structures

The layout of a typical node is depicted in FIG. 3B. Each node consists of header area 312, followed by an odd number of entries 314. This number of entries is referred to as 2n−1, for reasons explained below.

Header area 312, shown in FIG. 3C, contains descriptive data identifying the meaning and validity of the entries. IsLeaf flag 316 indicates whether the subject node is a leaf or an internal node. This is important since, as discussed above, an entry in a leaf node contains change flag information for a single text unit, while an entry in an internal node contains a pointer to another node and summarizes change flag information for all text units that are descendants of that node. Indices FirstValid 318 and LastValid 320 indicate the first and last of a contiguous group of entries that contain valid data. Finally, Parent field 322 contains a pointer to the node's parent node in the tree. If Parent field 322 contains a NIL pointer, this indicates that this node is the root.

Two key properties of nodes in the change flag tree are that every node, with the possible exception of the root, contains at least n valid entries and every node contains a maximum of 2n−1 entries. For example if n where chosen to be 5, each node would be constructed to contain a maximum of 9 entries. The purpose is to promote efficient space utilization by ensuring that a node is not added (i.e., "inserted" in data structure vernacular) unless it will be made to contain enough entries to make it at least half full. The exact mechanisms for insertion and deletion of nodes are described below, but a brief description is in order. If deleting an entry from a node would reduce it to less than n entries, it borrows entries from a neighbor to restore its membership to at least n entries. If the neighbor itself has only n entries, then the two nodes are combined into a single node with 2n−1 entries. This in turn requires deleting an entry at the next level up the tree in a recursive fashion. Similarly, if adding an entry to a node would cause it to exceed 2n−1 entries, the node is split into two nodes with n entries each, requiring a recursive insert at the next level up the tree. By ensuring that nodes are always at least half full, this mechanism guarantees that the space set aside for nodes in the change flag tree is well utilized, while still allowing nodes to grow and shrink substantially before incurring the cost of splitting and recombining nodes. Those skilled in the art will appreciate that it is possible to select other lower bounds on utilization of entries in a node, and that the present invention applies equally regardless of the exact lower bound chosen.

FIG. 3D shows example Entry 314. Each entry contains ChangeFlags field 326 and Location field 324. ChangeFlags field 326 contains k flags, where k is the number of word-processing functions that have incremental implementations. For entries in an internal node, Location field 324 describes the physical location of the child node on disk (or a cached copy in virtual memory). For entries in a leaf node, Location field 324 describes the physical location of the text unit to which ChangeFlags 326 apply. In the preferred embodiment, Location field 324 points to Data Structure 328. As shown in FIG. 3E and discussed below, Data Structure 328 is another word-processing data structure associated with the paragraph (i.e., as the chosen incremental unit).

Those skilled in the art will appreciate that the exact implementation of Location field 324 and ChangeFlags field 326 is a design choice and that the present invention applies equally regardless of the exact design chosen. For example, ChangeFlags field 326 need not be separated from Location field 324. In some implementations, a pointer may contain a number of bits that are effectively unused. For instance, to conserve space, an implementation might choose to store change flags in unused bit locations in the pointer and then mask off the change flags before dereferencing the pointer.

FIG. 3E shows the mapping between the leaf nodes and the text units. As shown, this mapping is bidirectional; that is, the location of the leaf entry that contains its change flags is stored with each text unit. In the preferred embodiment, the word processor has Data Structure 328 which is used to maintain information about each text unit. While at a minimum, Data Structure 328 must contain Text pointer 334 to Text 336, the preferred embodiment of Data Structure 328 includes three additional fields: Node pointer 330, which points to Header 312 of the leaf node that contains Change-Flags 326 for the text unit; Entry pointer 332, which points to Entry 314 within that node where ChangeFlags 326 are located (Location field 324 in entry 314 points back at Data Structure 328); and Flags field 338, which contains a cached copy of ChangeFlags 326. While this cached copy is not strictly necessary, it is present in the preferred embodiment to enhance performance since, as discussed below, the change flags for a text unit must be inspected each time the text unit is modified.

FIG. 3F contains an example of a change flags tree for the document depicted in FIG. 2. For purposes of illustration, the value of n is chosen to be 2, so that each node contains m=2n−1=3 entries. This allows an example to fit on one page. It must be emphasized that this example is presented for explanation only and that a typical value of n would be much larger (say, 50).

FIG. 3F shows a change flags tree containing three nodes: root 340 and leaves 342 and 344. In each node, the fields of header 312 are abbreviated as follows: IL=IsLeaf, FV=FirstValid, LV=LastValid, P=Parent. IsLeaf field 316 is 1 for leaf nodes 342 and 344, and 0 for root node 340. Leaves 342 and 344 have root 340 as their parent, while root 340 has no parent. In this example, assume that each entry's ChangeFlags field 326 contains two flags, one representing spell-checking and one representing hyphenation. In a leaf node, a change flag having a value of 1 indicates that the corresponding function (spell-checking or hyphenation) needs to be performed for the corresponding text unit because the text is new or has been modified since the last time the particular special processing function was performed. A value of 0 indicates that the corresponding function does not need to be performed. The meanings of the change flags in internal nodes are similar, except that a value of 1 indicates that the corresponding function needs to be performed for some text unit associated with a descendant leaf in the tree. In all nodes, a value of X (as shown in FIG. 3F) indicates that a flag's value is unknown and unimportant; this is true of flags appearing in entries that are not currently valid. As shown, all paragraphs are up-to-date with respect to hyphenation, but paragraph 202 needs to be spell-checked. Thus the spell-checking flag is set in paragraph 202's leaf entry, and also in the summary entry (i.e., summary change flag information) for node 342 in root node 340. Location fields 324 are shown with an arrow to represent a non-NIL pointer, or a slash to represent a NIL pointer.

Detailed Mechanisms

Figures 1, 3G:
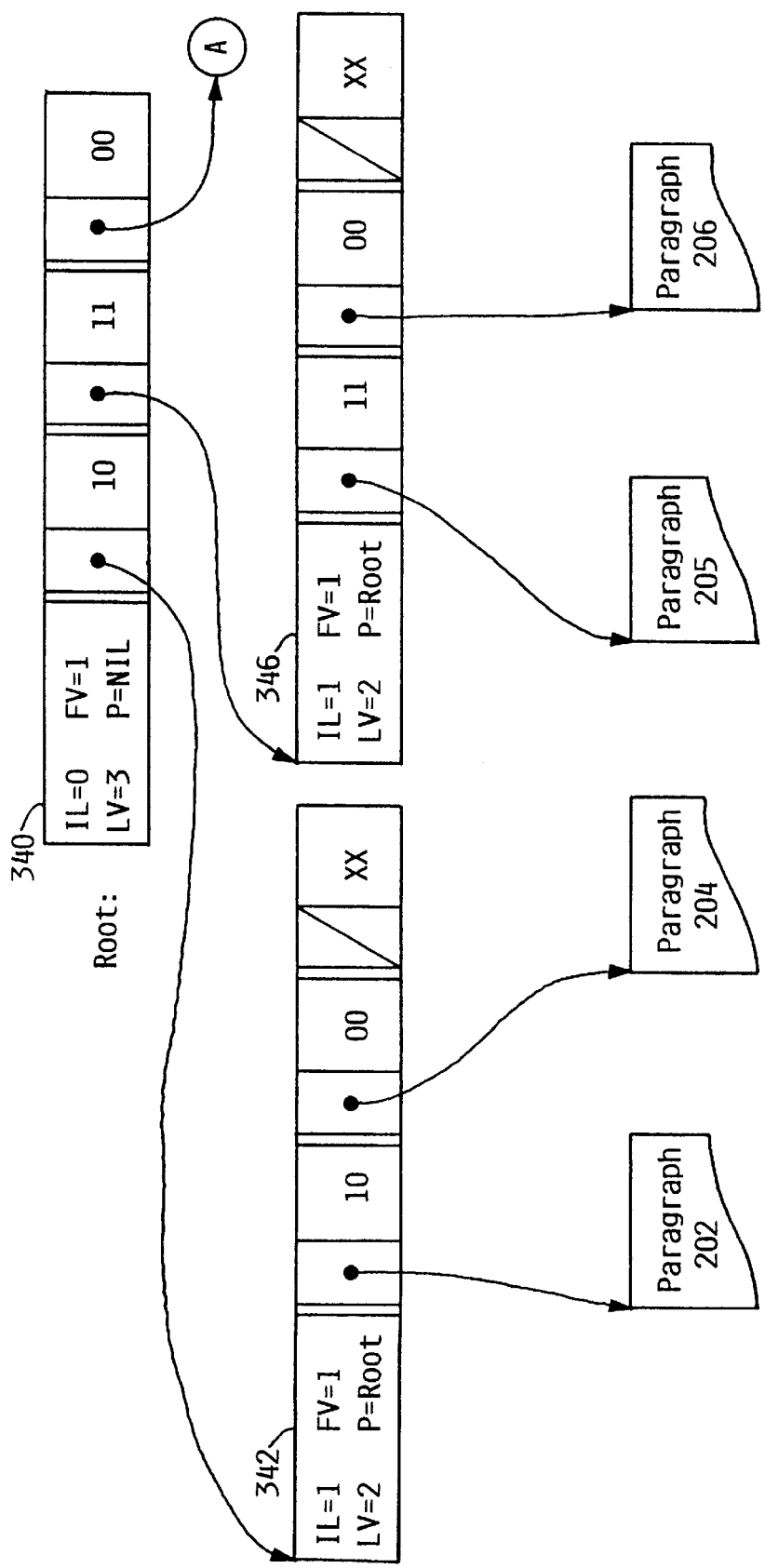
Figures 2, 3G:
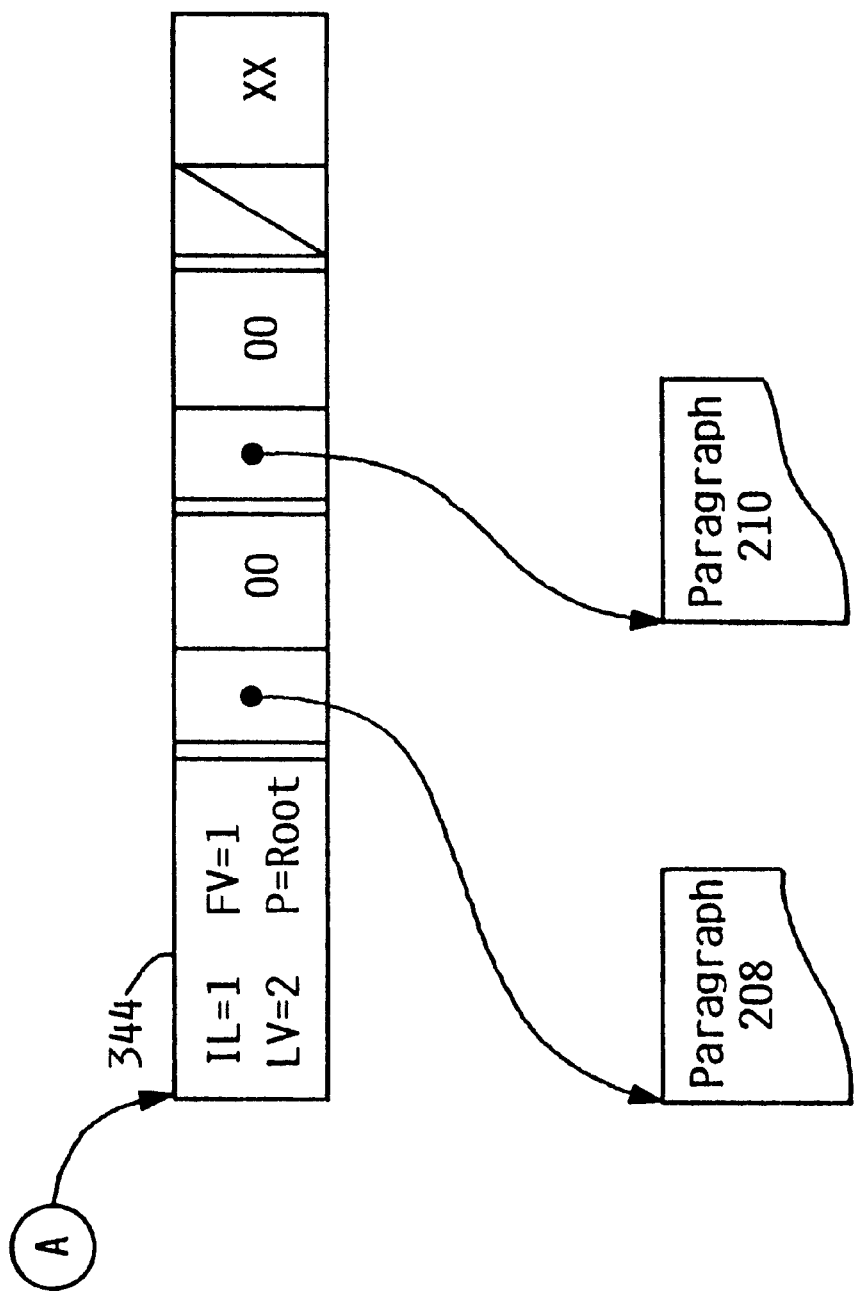
Figure 3H:
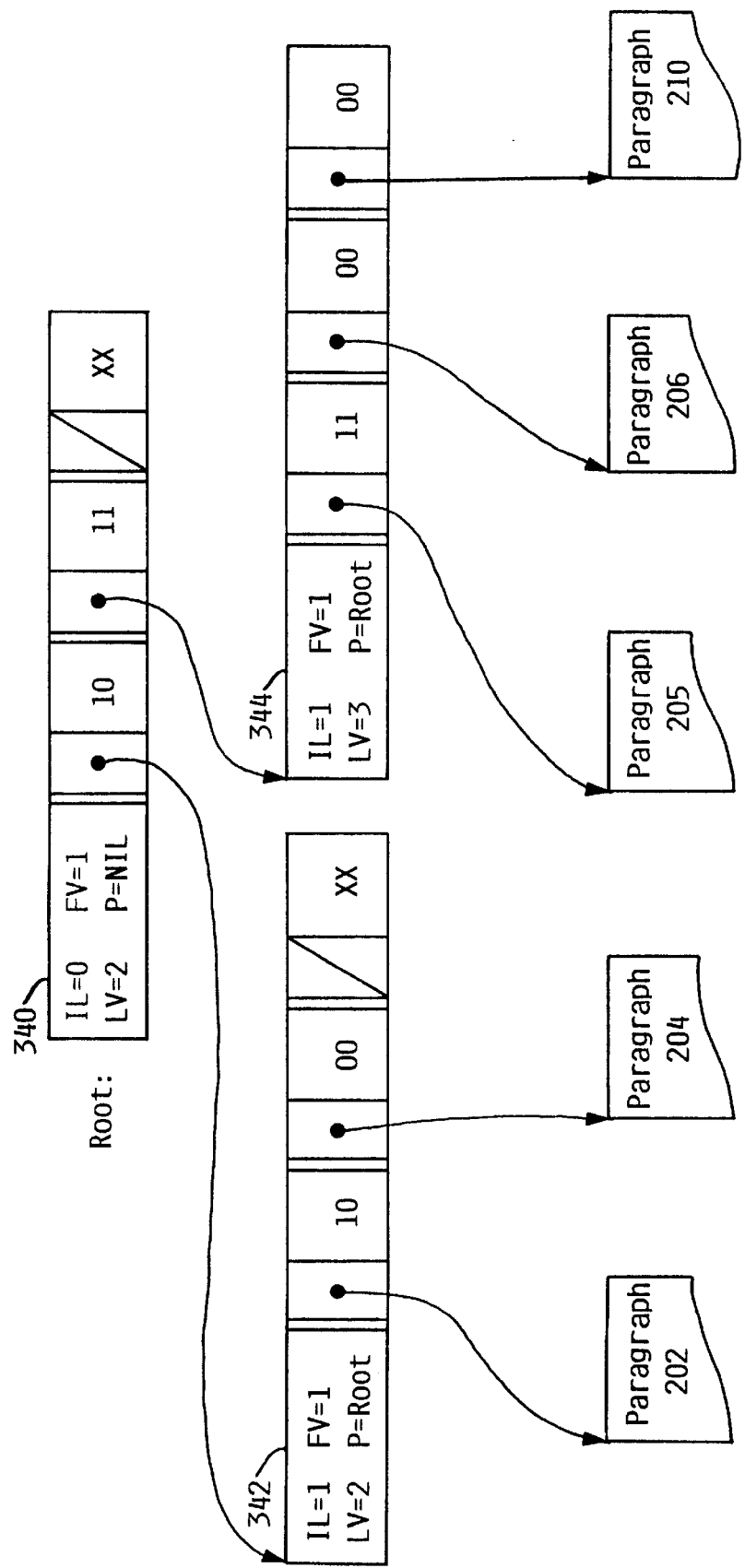
Figure 31:
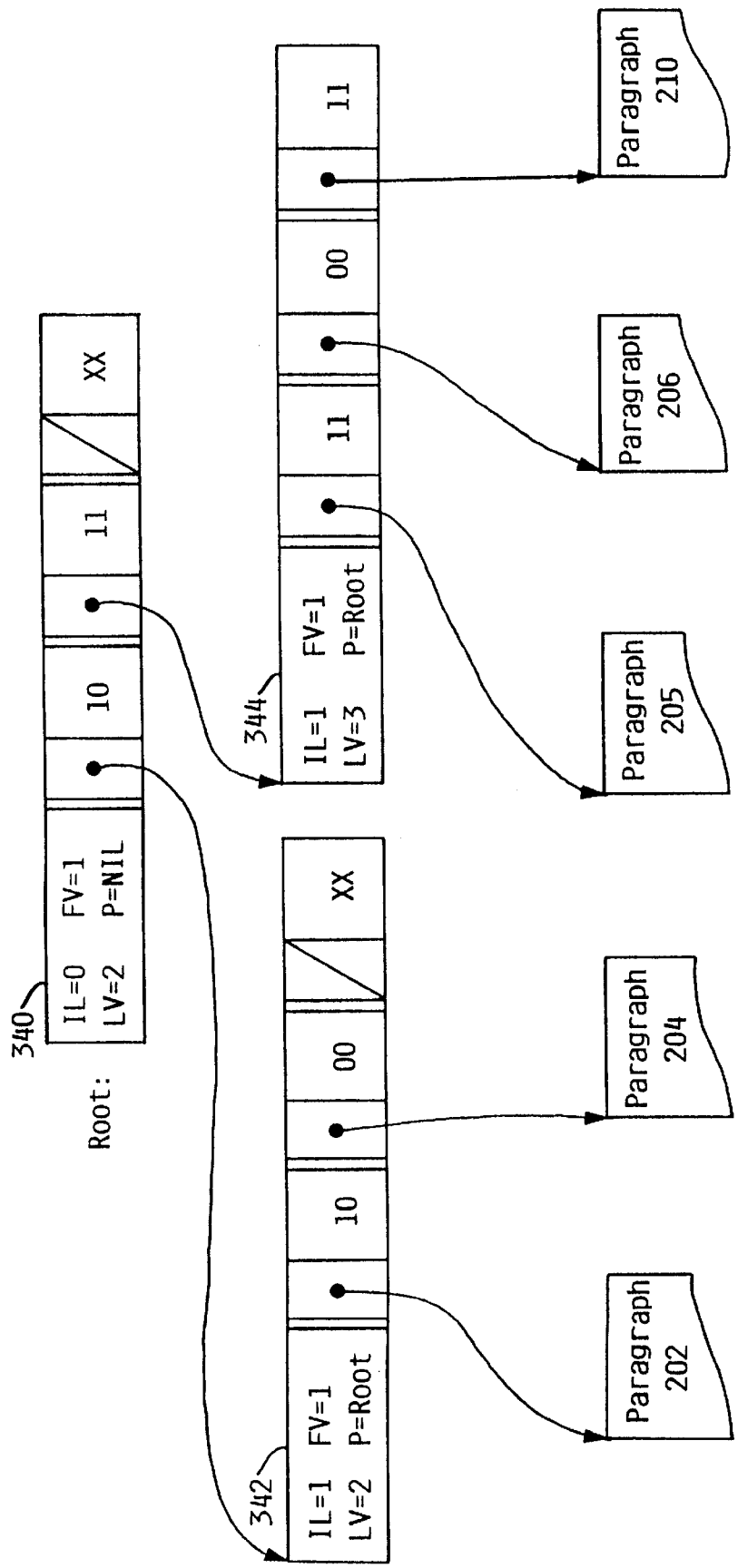
Figure 3J:
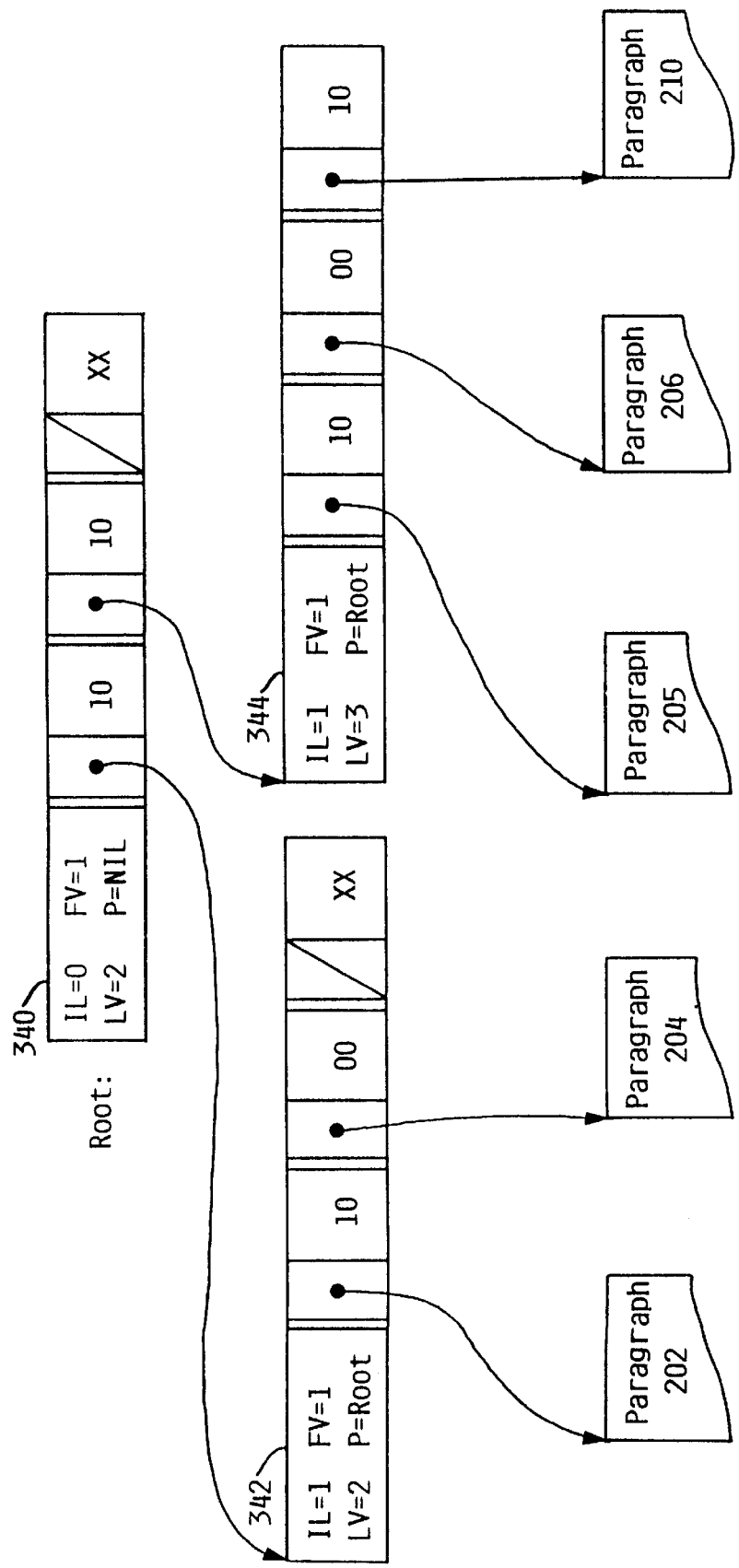
Figure 4A:
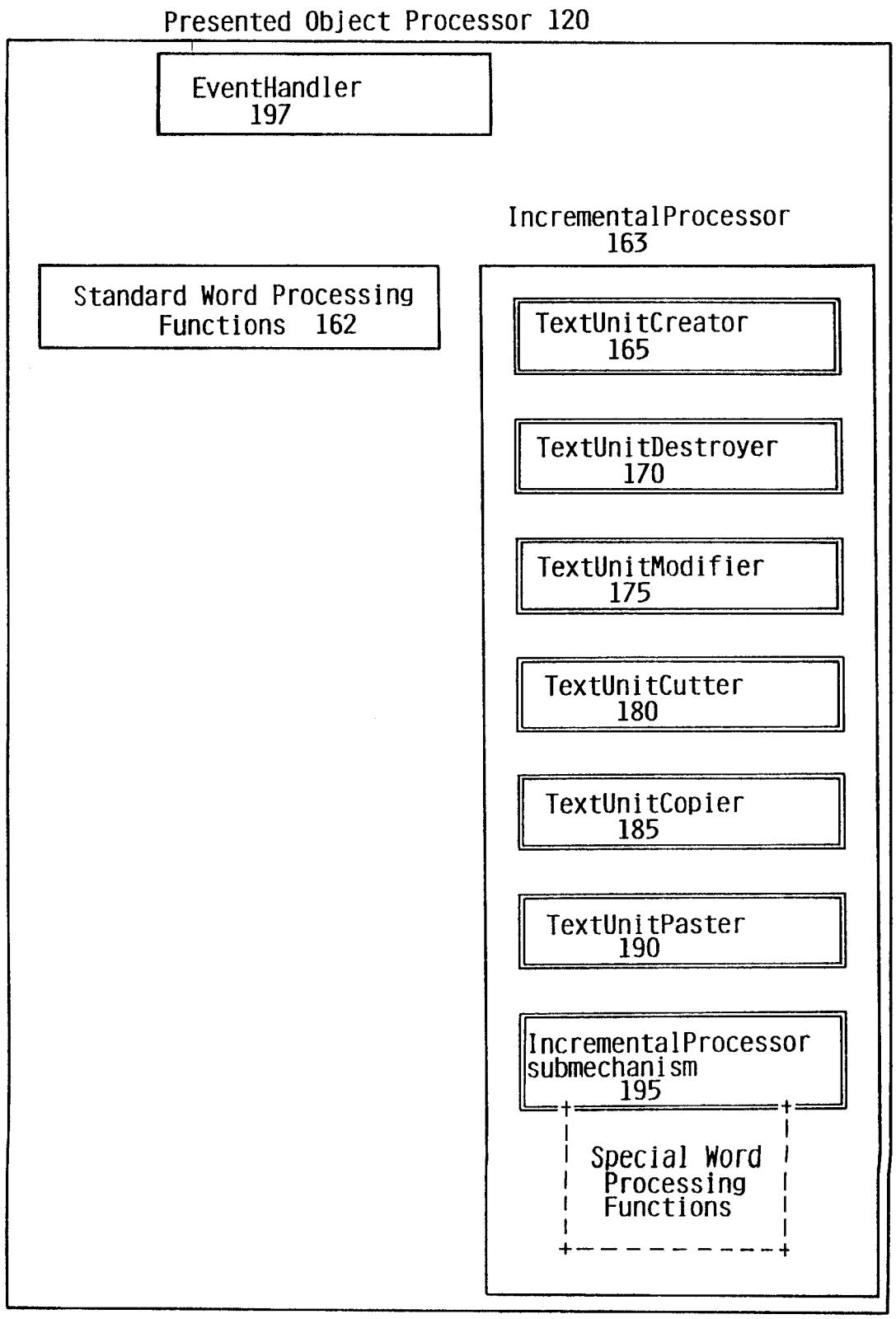
FIGS. 4A through 4P are diagrams depicting the inner workings of the preferred embodiment in response to specific actions by the user of the word processor or other publishing system.
Figures 2, 4B:
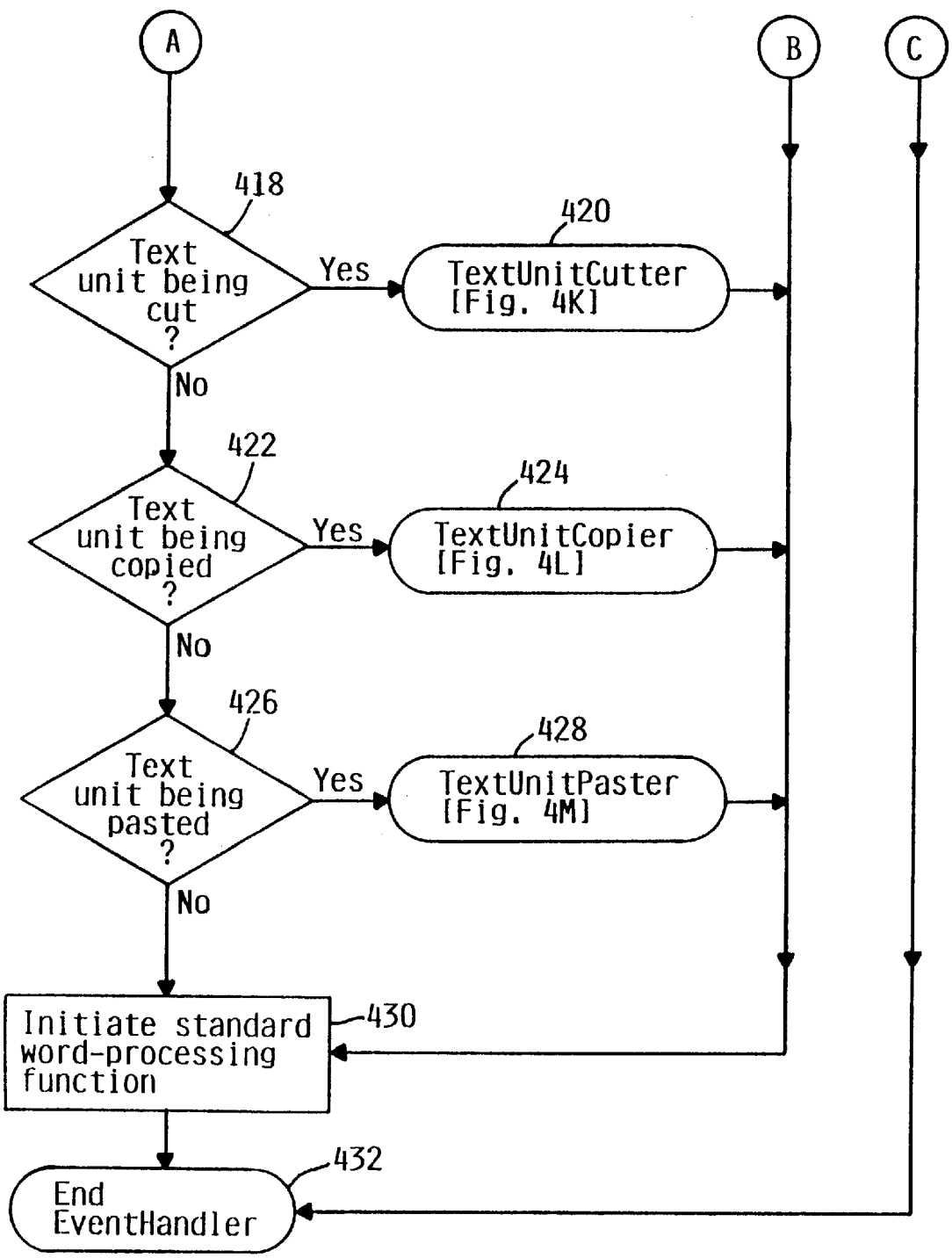
Figure 4C:
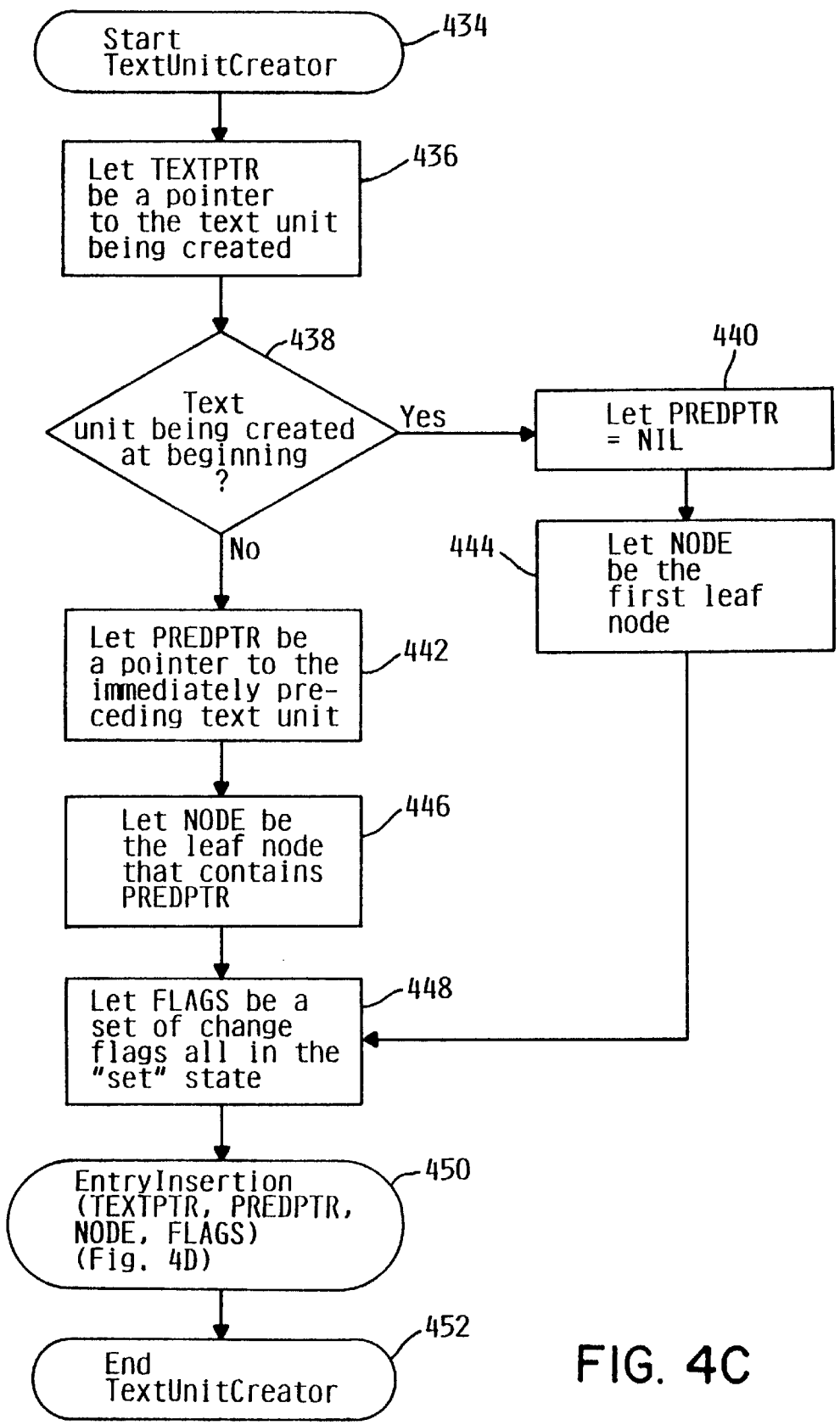
Figure 4D:
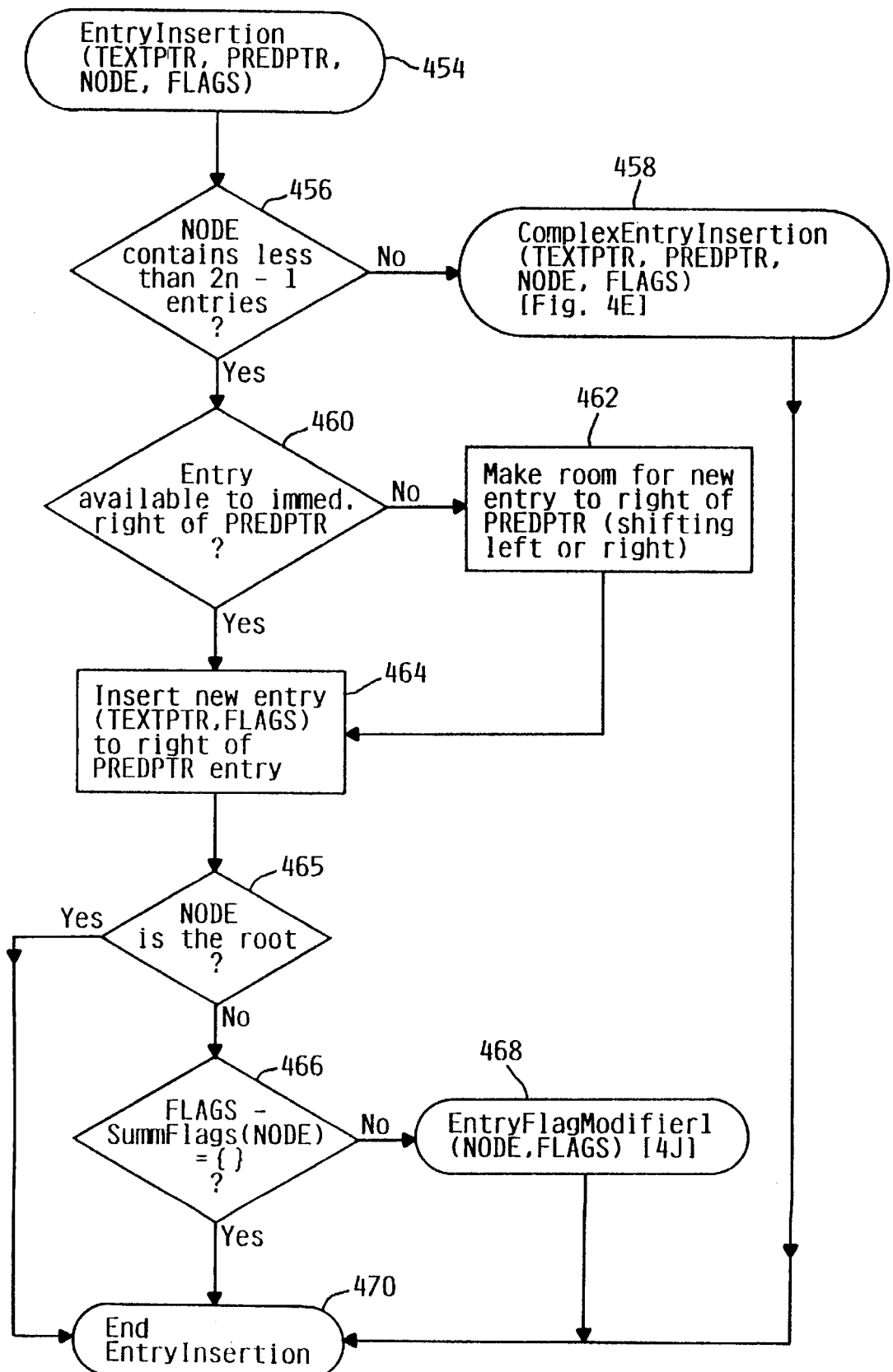
Figures 1, 4E:
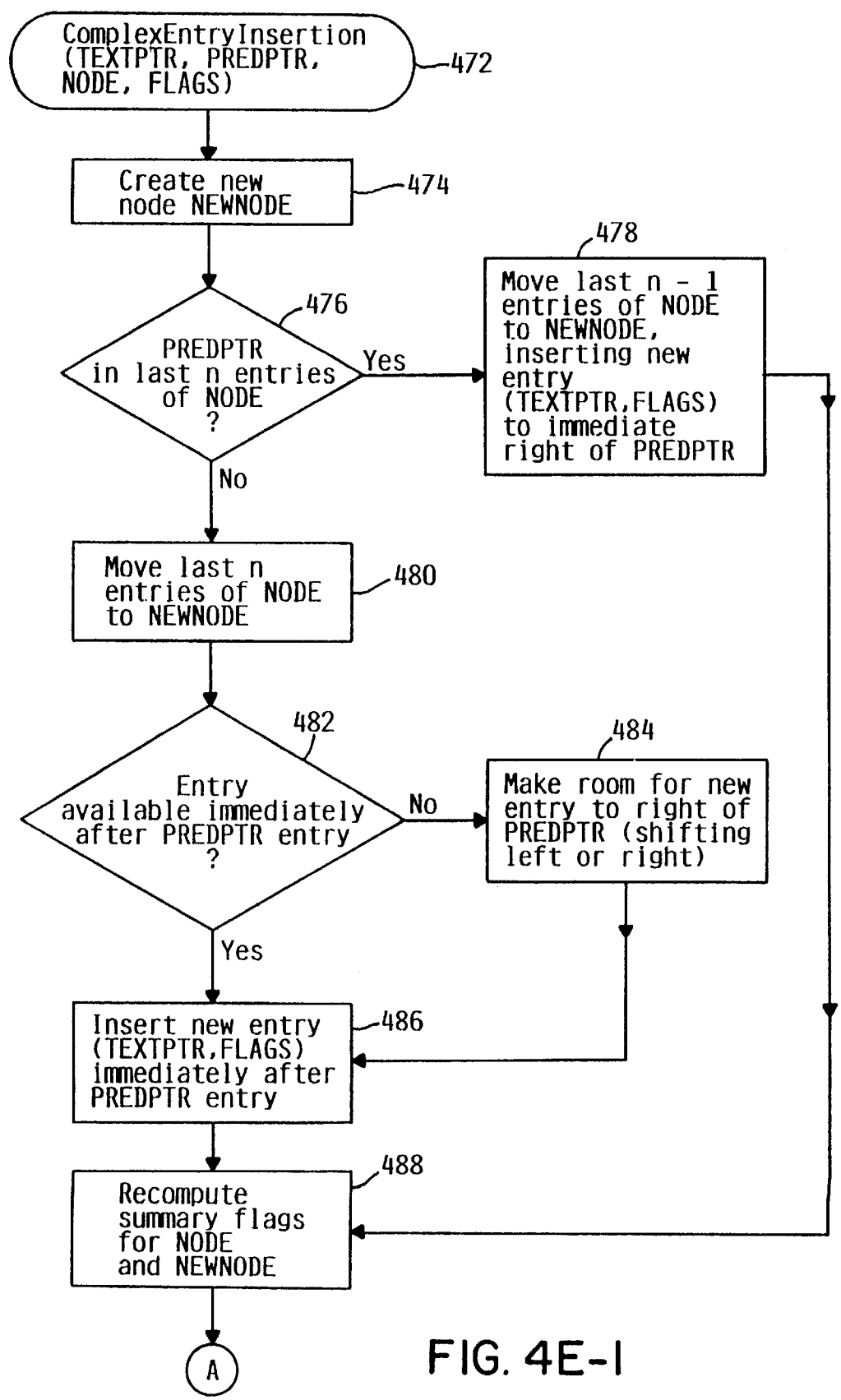
Figures 2, 4E:
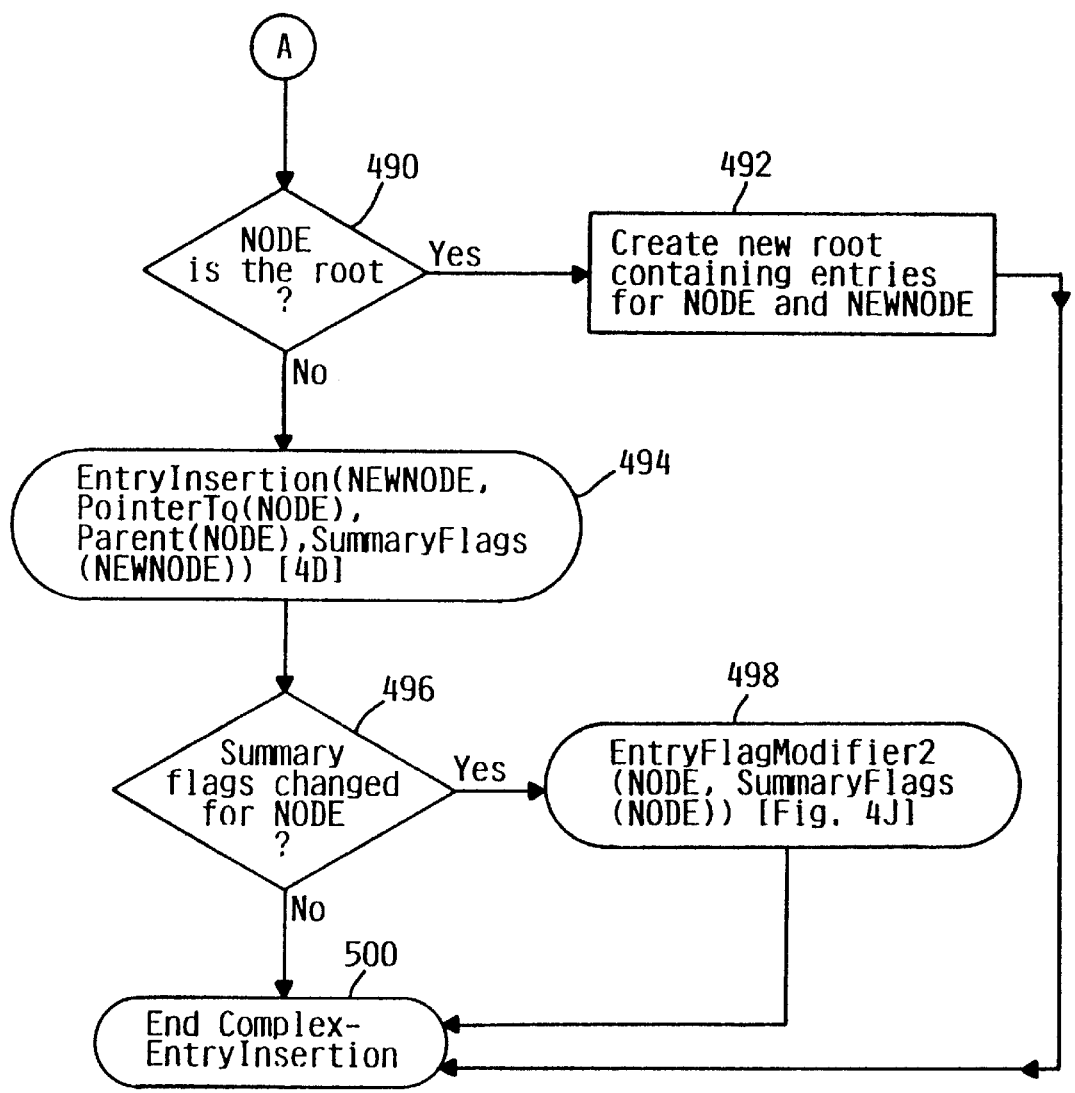
Figure 4F:
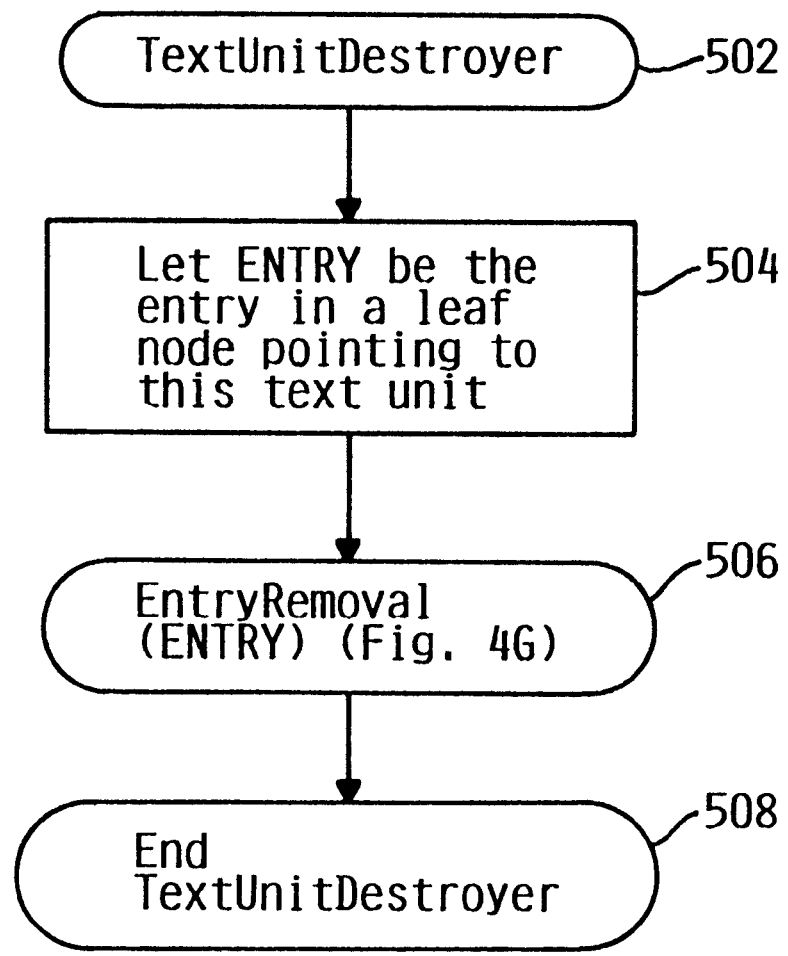
Figure 4G:
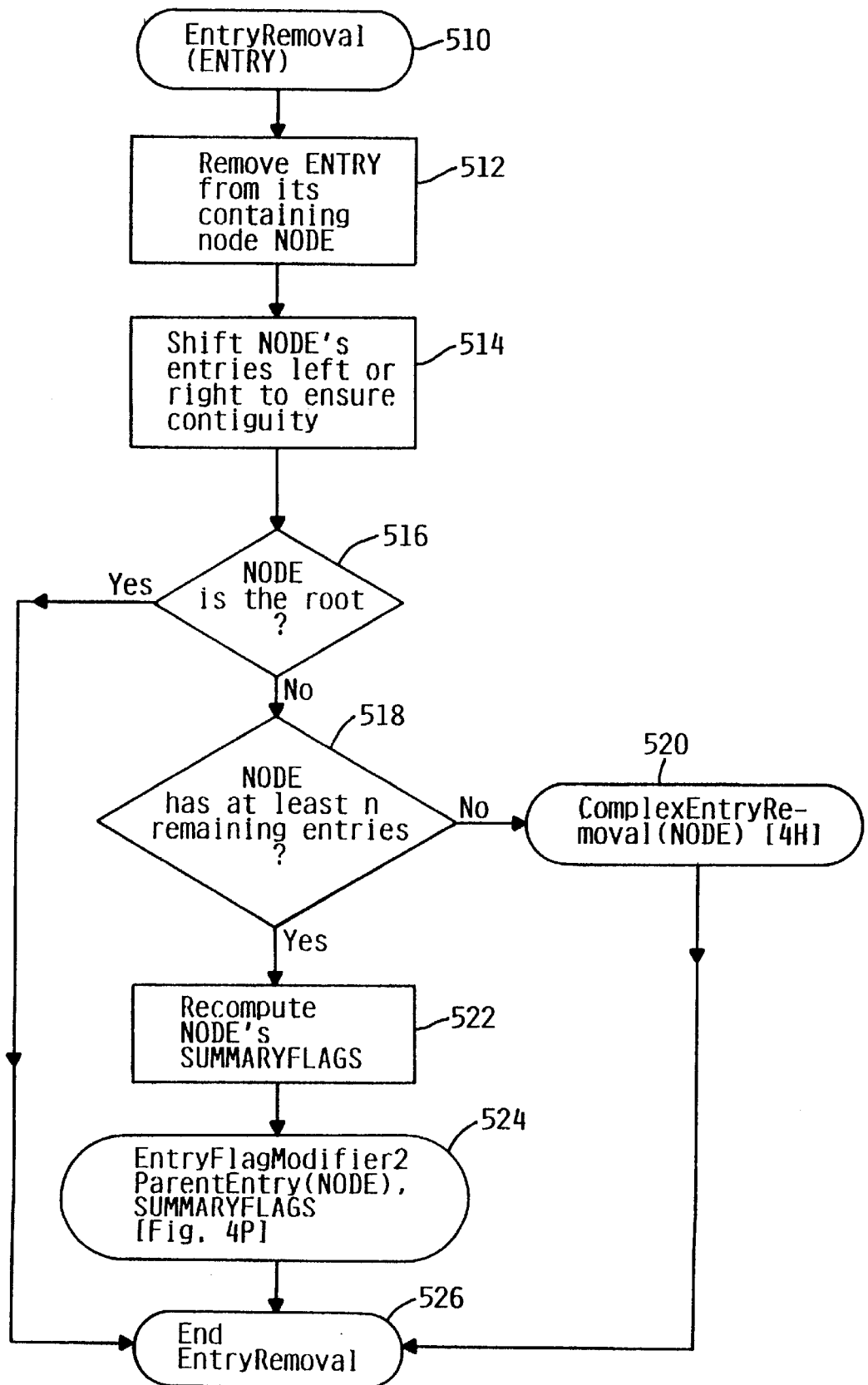
Figure 4H:
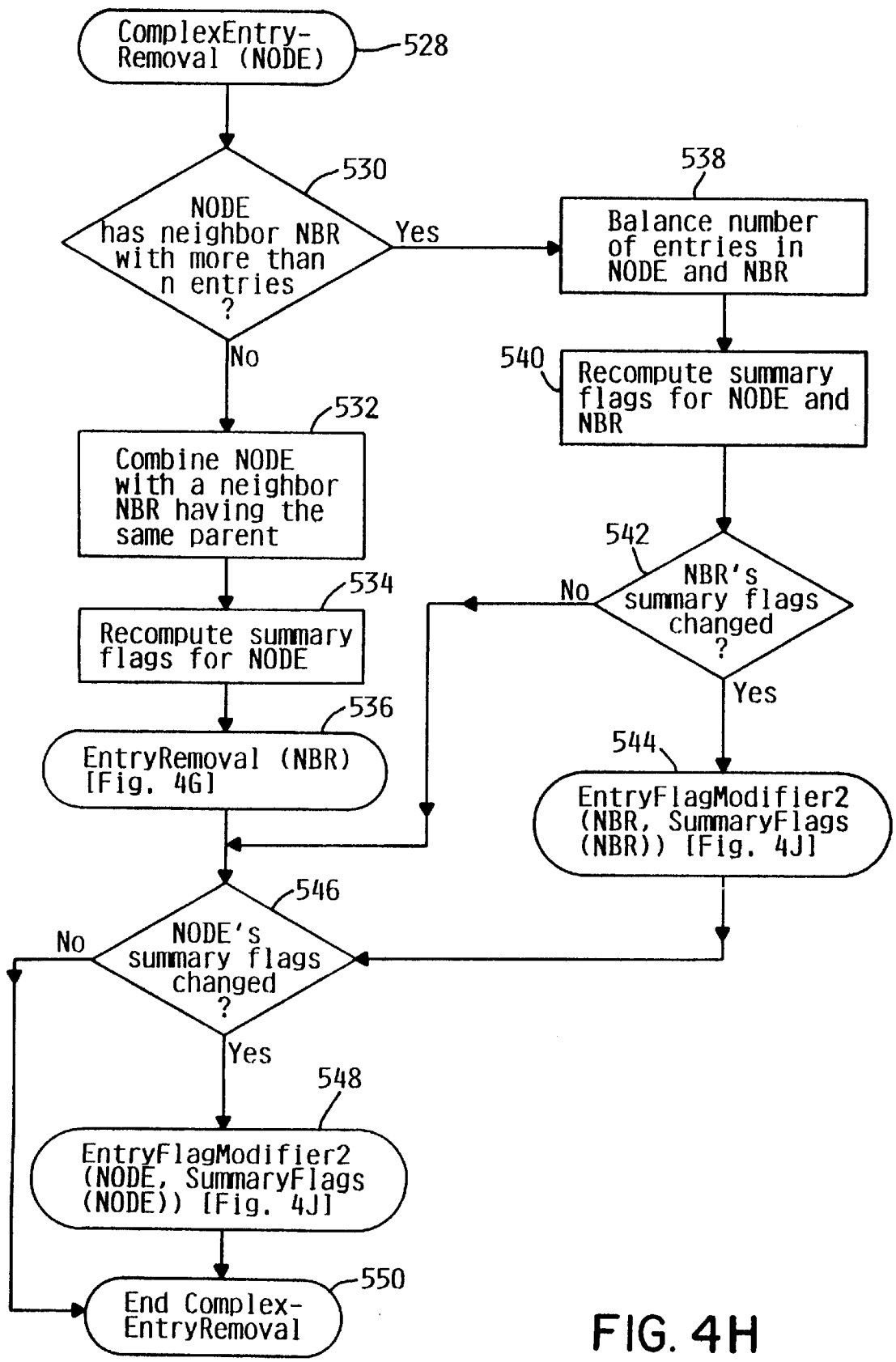
Figure 41:
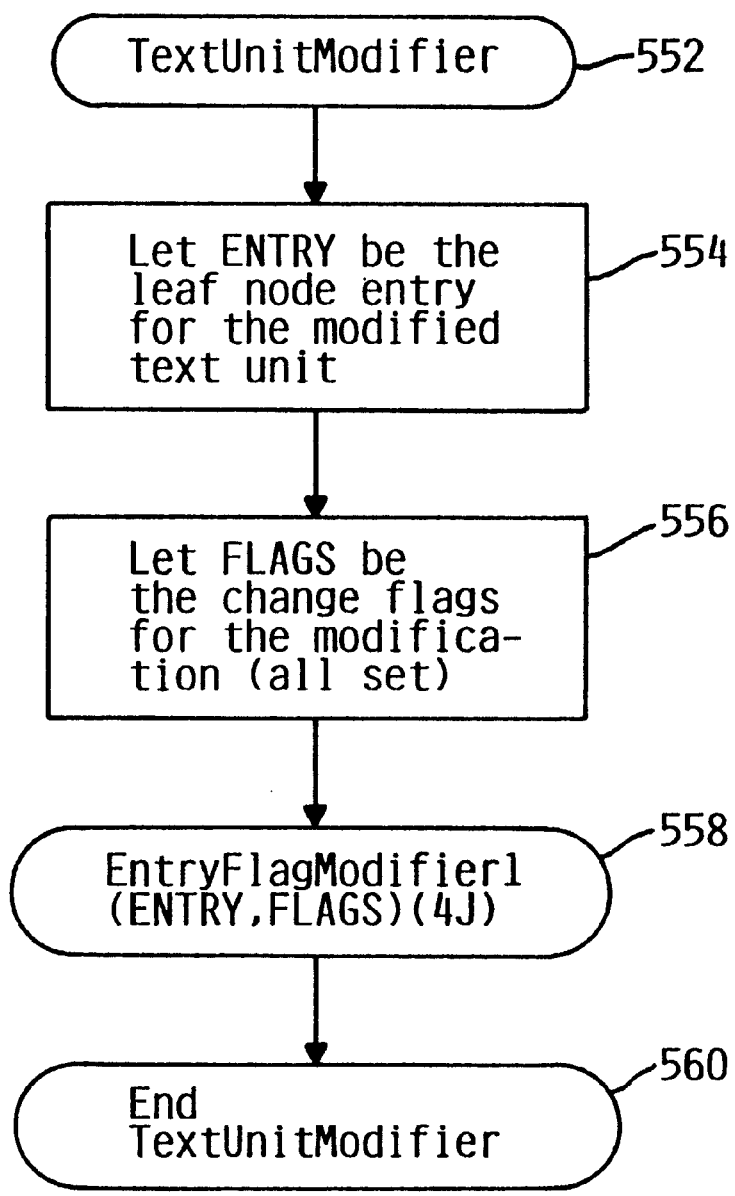
Figure 4J:
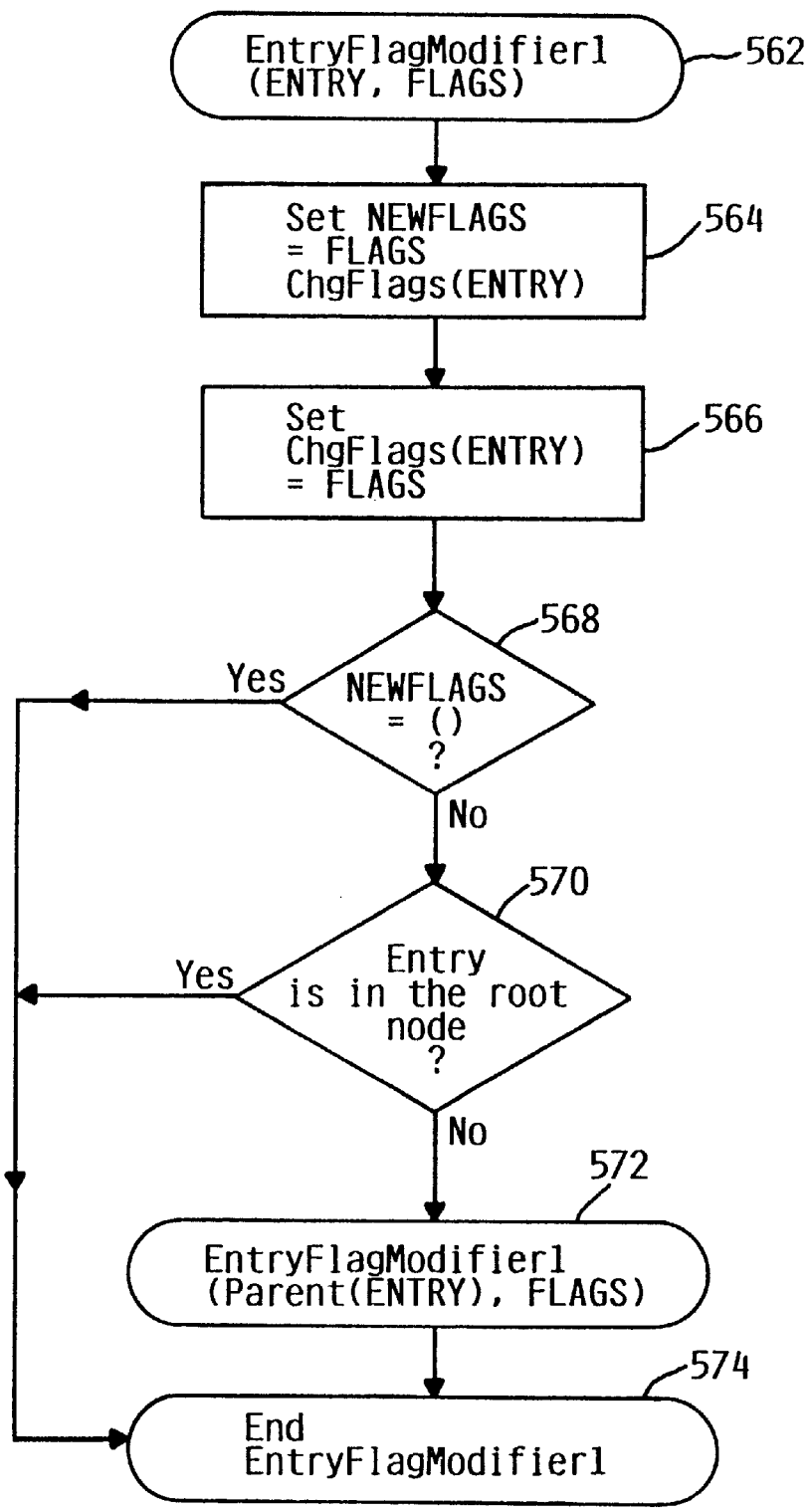
Figure 4K:
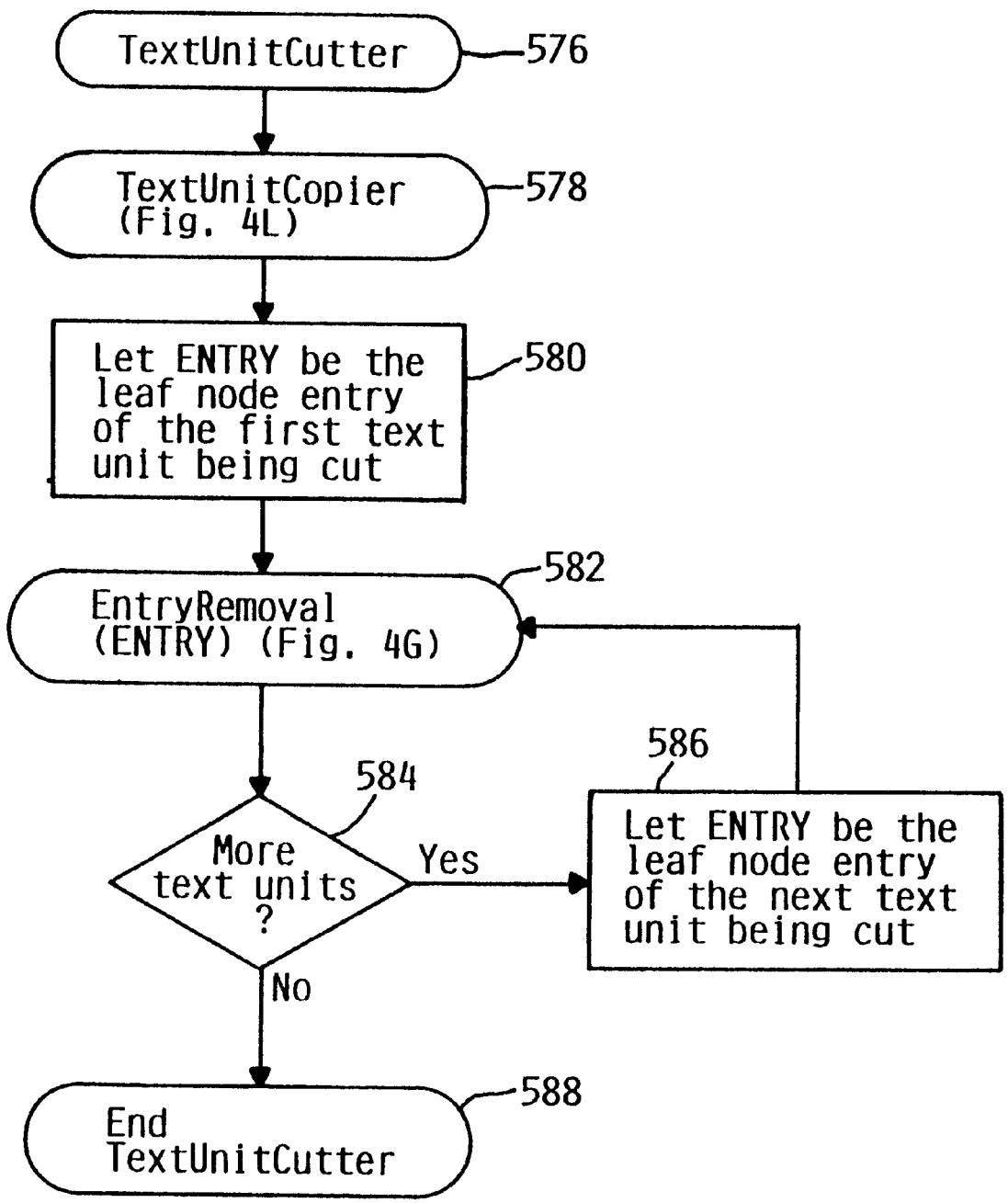
Figure 4L:
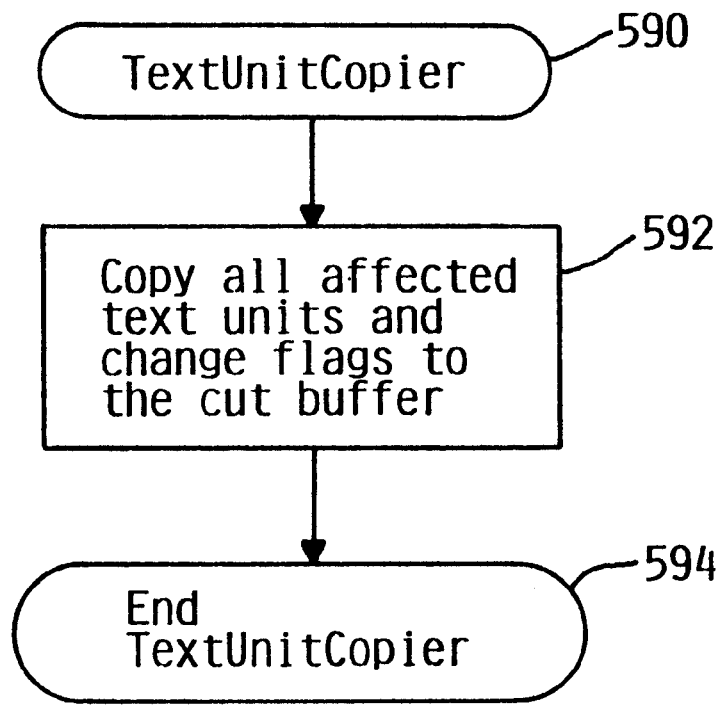
Figure 4M:
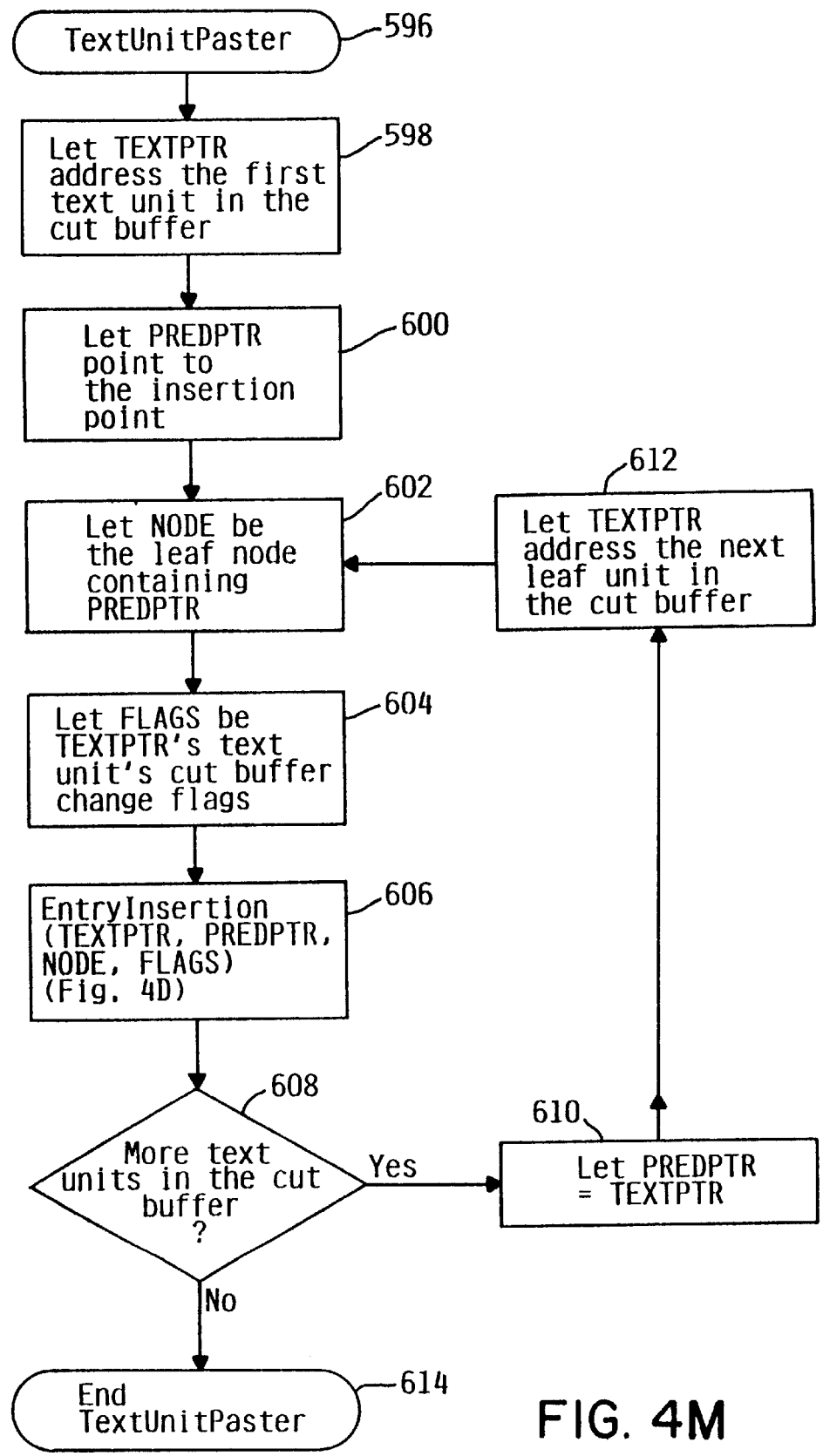
Figure 4N:
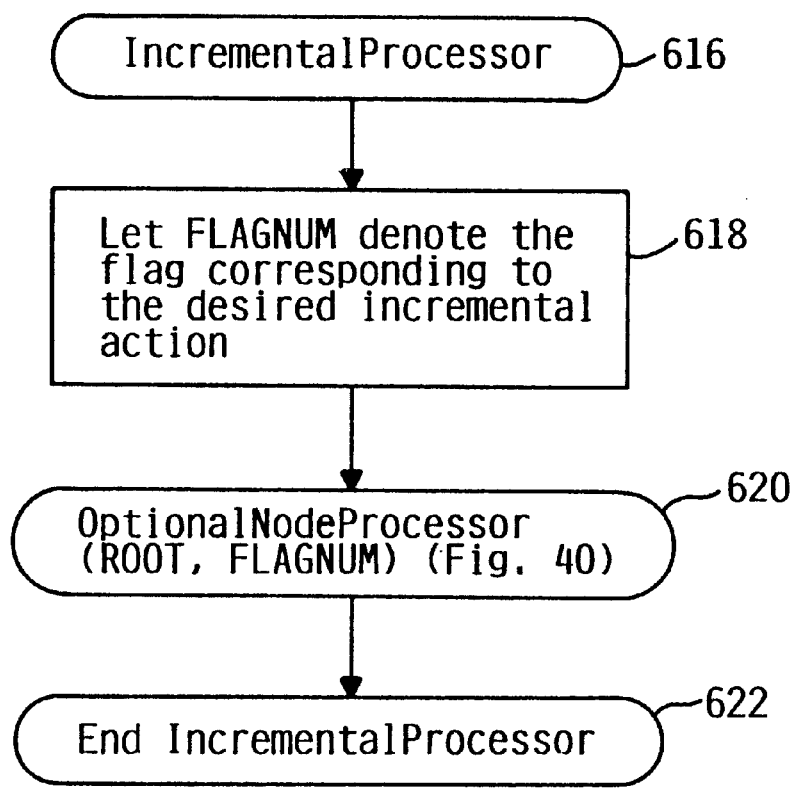
Figure 40:
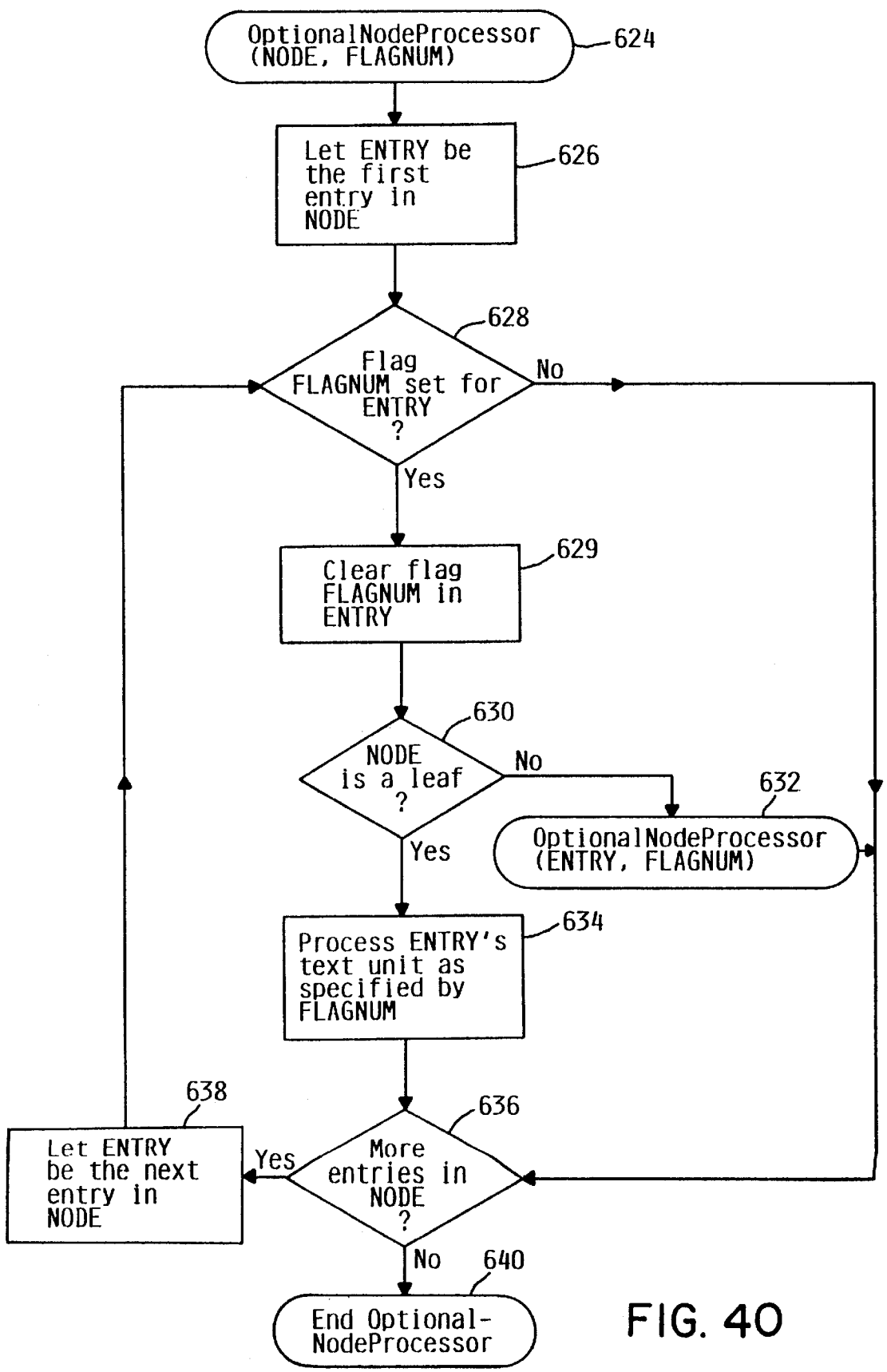
Figure 4P:
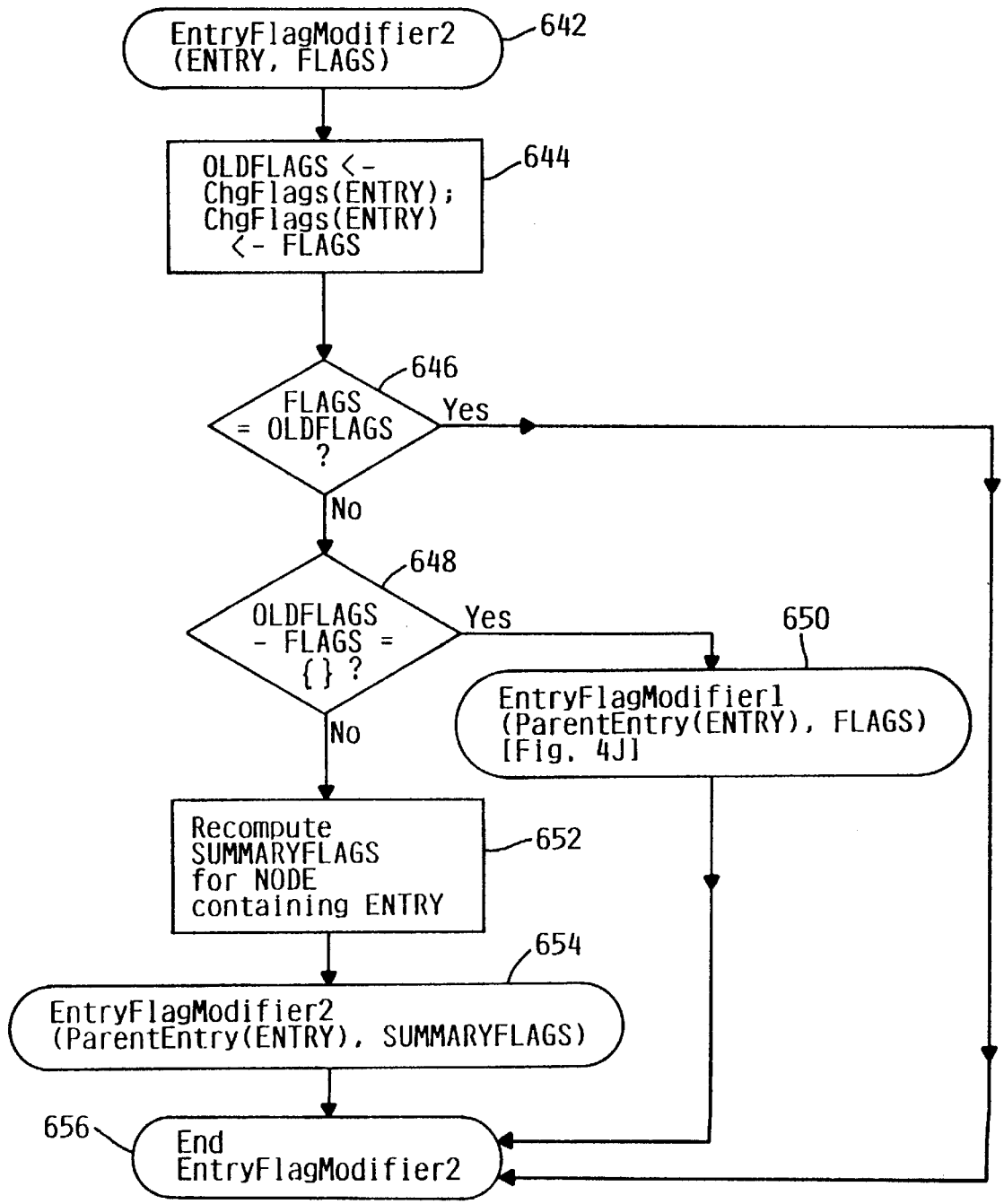

FIGS. 4A through 4P will now be used to describe the detailed mechanisms of the present invention. Where appropriate, the description of each mechanism will be followed by an explanatory example. FIGS. 3G through 3J will be used to illustrate these examples.

FIG. 4A shows an exploded view of Presented Object Processor 120 of the preferred embodiment. As shown, Presented Object Processor 120 is comprised of EventHandler 197, which is responsible for receiving and handling requests from the user; Standard Word Processing Functions 162, which are responsible for performing basic word processing operations such as adding text, deleting text, moving the cursor, etc.; and IncrementalProcessor 163, which is responsible for analyzing and updating the hierarchical change flag structure and for incrementally processing special word processing functions (see IncrementalProcessor submechanism 195).

FIG. 4B shows EventHandler 197 of the preferred embodiment. A word processor operates by repeatedly accepting input from the user and processing the user's request. User requests are received and processed by EventHandler 197. When a user request is received, EventHandler 197 determines whether the user request is for a special processing function (IncrementalProcessor submechanism 195—block 402). If the user request is not a request for a special processing function, EventHandler 197 either initiates the appropriate standard function directly (i.e., one of Standard Word Processing Functions 162) or EventHander 197 initiates the mechanism that is responsible for modifying the hierarchical change flag structure (i.e., logging the change information into the hierarchical change flag structure). Requests that are of this latter type involve: creation of a new text unit (TextUnitCreator mechanism 165—block 408); deletion of a text unit (TextUnitDestroyer mechanism 170—block 412); modification of a text unit (TextUnitModifer mechanism 175—block 416); "cutting" (deletion and copying to a "cut buffer") of a text unit (TextUnitCutter mechanism 180—block 420); copying a text unit to a cut buffer (TextUnitCopier mechanism 185—block 424); and pasting cut buffer contents into a document (TextUnitPaster mechanism 190—block 428). Once the information is logged into the hierarchical tree structure (data base), EventHandler 197 proceeds to initiate the appropriate standard function (i.e., one of Standard Word Processing Functions 162) in block 430.

TextUnitCreator

Each time the user requests creation of a new text unit, the event is received and handled by Event Handler 197 in blocks 402 and 404. A change flag entry for each new text unit must be inserted in the change flag tree. TextUnitCreator 165, which is initiated in block 408 by Event Handler 197, is responsible for performing this function. FIG. 4C shows how TextUnitCreator 165 determines the node in which to insert the new entry. Again, as shown in FIG. 3B, each node contains header information and potentially several entries. The appropriate node is identified by the variable NODE. The location of the change flag entry for the new text unit is determined by its context; that is, the change flag entry must lie logically between that of the text unit's predecessor entry and that of its successor entry. In the preferred embodiment, TextUnitCreator 165 adds the entry following the predecessor's entry; however, it would also be possible to instead always add new entries prior to the respective successor entry. The difference is meaningful in that the change flag entries for the predecessor and successor may appear in different leaf nodes which means that a new entry might end up in a different leaf node depending on where it was added.

To accomplish the insertion, TextUnitCreator 165 first assigns the address (i.e., the memory address within Data Storage 140) of the new text unit to the pointer variable TEXTPTR (block 436). TEXTPTR then points to Data Structure 328 (as shown on FIG. 3E). If the text unit is being created after another text unit (block 438), TextUnitCreator 165 assigns pointer variable PREDPTR to the memory location of the preceding text unit (block 442) and assigns the node that contains the change flags for this text unit to NODE (block 446). On the other hand, if the text unit is being created at the beginning of the document (block 438), TextUnitCreator 165 assigns PREDPTR equal to a NIL pointer (block 440), and assigns the first (leftmost) leaf node in the change flag tree to NODE (block 444). Since the user could not have requested a special processing function (i.e., spell-checking, hyphenation, and so forth) for this new text unit, TextUnitCreator 165 assigns a set of change flags all of whose values are 1 to the variable FLAGS, indicating that no incremental processing functions have yet been requested for this new text unit. TextUnitCreator 165 then initiates the EntryInsertion submechanism (block 450).

FIG. 4D shows the inner workings of the EntryInsertion submechanism. The EntryInsertion submechanism inserts a change flag entry for the new text unit (identified by TEXTPTR) into a given NODE at a position following the entry for the text unit identified by PREDPTR. Please note that if PREDPTR is NIL, the insertion point for TEXTPTR is the first entry slot in the node structure in the node identified by the variable NODE. There are several cases to consider. First assume that NODE is not full, i.e., that it contains less than 2n−1 entries (block 456). Further assume that PREDPTR points to a text unit whose entry is addressed by LastValid field 320 of NODE's Header field 312, and that there is an empty entry slot following this entry (block 460). In this case, the EntryInsertion submechanism inserts the new entry (having Location field 324 equal to TEXTPTR and Flags field 326 equal to FLAGS) into the empty slot, and updates NODE's LastValid field 320 to address the new change flag entry (block 464).

Assume instead that NODE is not full (block 456), but that this time there is no available slot for the new entry following the entry for PREDPTR (block 460). If this is the case, the EntryInsertion submechanism makes room for the new entry, either by shifting left all entries to the left of the insertion point, or shifting right all entries to the right of the insertion point (block 462). Since NODE is not full, one of these methods is always possible. The EntryInsertion submechanism always chooses the least expensive method, as determined by consulting FirstValid 318 and LastValid 320 fields in NODEs header 312.

In all cases considered to this point, the EntryInsertion submechanism must also determine whether the change flags for NODEs ancestors in the tree must be updated (blocks 465, 466, 468, and 470). If the node identified by the variable NODE is the root node of the change flags tree (block 465), no updates are required. Otherwise, the first step (block 466) is to consult NODE's parent to find NODE's summary flags (i.e., summary change flag information). If there are any change flags in the set state in FLAGS that are in the cleared state in NODEs summary flags (i.e., the summary flags contained in NODE's parent node), then the EntryInsertion submechanism proceeds to set the appropriate flags in the summary flags field of NODE's parent node (block 468). To accomplish this, the EntryInsertion submechanism initiates the EntryFlagModifier1 submechanism. The EntryFlagModifier1 submechanism is a recursive mechanism that proceeds up the change flag tree and updates summary flags fields of ancestor nodes until it finds either the root node or an ancestor node whose flags do not require change.

As shown on FIG. 4J, the EntryFlagModifier1 submechanism assigns the variable NEWFLAGS to be a set of change flags in which a flag is in the set state if and only if it is set in FLAGS but not set in the change flags for ENTRY (block 564). (This is the meaning of "NEWFLAGS=FLAGS−ChgFlags(ENTRY)" in block 564; the "−" symbol here is not subtraction, but set difference.) EntryFlagModifier1 then modifies the change flags for ENTRY to hold the value in FLAGS (block 566). If no flags are set in NEWFLAGS (block 568), or ENTRY is in the root node (block 570), EntryFlagModifier1 ends in block 574. Otherwise, EntryFlagModifier1 recursively invokes itself by assigning ENTRY to be the parent entry of the node containing ENTRY and leaving FLAGS unchanged (block 572).

Returning back to block 456 of FIG. 4D, the remaining case occurs when NODE is already full (block 456). In this case the EntryInsertion submechanism must split the node identified by the variable NODE into two nodes, with half of its 2n entries (including the new one) being moved to a new node. In the preferred embodiment, the EntryInsertion submechanism places the n entries in each resulting node in the middle of the nodes, leaving room on each side to ensure that future updates are as rapid as possible. Since NODE has been split, the EntryInsertion submechanism must insert a new summary entry into NODEs parent node. This in turn may require the EntryInsertion submechanism to split NODE's parent, and so on up the tree. If the EntryInsertion submechanism must split the root, it creates a new root with only two entries. Recall that the root is the only node permitted to have less than n entries.

FIG. 4E shows the ComplexEntryInsertion submechanism. As shown, the ComplexEntryInsertion submechanism first creates a new node (block 474) which the ComplexEntryInsertion submechanism assigns to the variable NEWNODE. NEWNODE's IsLeaf field 316 is set to the same value as NODE's IsLeaf field 316. If the change flag entry in NODE for PREDPTR is in the rightmost n entries of NODE (block 476), the ComplexEntryInsertion submechanism moves the last n-1 of these entries to NEWNODE, inserting the new change flag entry (with Location field 324 set to TEXTPTR and Flags field 326 set to FLAGS) after PREDPTR (block 478).

If the entry in NODE for PREDPTR is in the leftmost n-1 entries of NODE, the ComplexEntryInsertion submechanism moves the last n entries of NODE to NEWNODE (block 480). Then, if necessary (block 482), the ComplexEntryInsertion submechanism shifts the entries in NODE left or right to create an empty entry slot following PREDPTR's entry (block 484). The ComplexEntryInsertion submechanism then inserts the new entry in the empty slot (block 486).

In either case, the ComplexEntryInsertion submechanism must recompute the summary flags for NODE and NEWNODE (block 488). Since half of the change flags in NODE have moved to NEWNODE, there is no way to tell which flags must be set in the two nodes' summary entries without recomputing them (unless the summary flags for NODE were originally all identical). The ComplexEntryInsertion submechanism recomputes the summary flags by logically ORing the change flags for all valid entries in each node (block 488). Note that this step just computes the summary flags' values; it does not record them in the tree.

Finally, the ComplexEntryInsertion submechanism must insert an entry in the change flag tree for NEWNODE and record the new summary flags for NODE. If NODE is the root node (block 490), then the root has just been split, so the ComplexEntryInsertion submechanism must create a new ROOT node containing entries for NODE and NEWNODE using the summary flags just computed (block 492), setting Parent field 322 of both nodes to ROOT. The ComplexEntryInsertion submechanism then returns to the EntryInsertion submechanism in block 500 which itself returns to TextUnitCreator 165. TextUnitCreator 165 then terminates execution in block 452.

If NODE is not the root (block 490), the ComplexEntryInsertion submechanism recursively invokes the EntryInsertion submechanism (FIG. 4D), thereby assigning TEXTPTR to point to NEWNODE, PREDPTR to point to NODE, NODE to be the parent of NODE, and FLAGS to be the new summary flags just calculated for NEWNODE (block 494). Further, if NODE's summary flags changed when they were recomputed (block 496), the ComplexEntryInsertion submechanism initiates the EntryFlagModifier2 submechanism (FIG. 4P) with NODE's new summary flags (block 498) in order to propagate the changes up the tree.

The EntryFlagModifier2 submechanism is used when it is possible that change flags have gone from the set state to the cleared state. If change flags can only have gone from the cleared state to the set state, the EntryFlagModifier1 mechanism of FIG. 4J is used. The first step in FIG. 4P is to save the current change flags for the subject change flag entry (i.e., the entry identified by the variable ENTRY) as the variable OLDFLAGS, and set the change flags for ENTRY to the values of the variable FLAGS (block 644). If the values of FLAGS and OLDFLAGS are equal (block 646), the task of the EntryFlagModifier2 submechanism is complete. If their values differ, but OLDFLAGS has no flags set that are not also set in FLAGS (block 648), the EntryFlagModifier2 submechanism invokes the EntryFlagModifier1 submechanism for the parent entry of the node containing ENTRY (block 650). Otherwise, the EntryFlagModifier2 submechanism recomputes the summary flags (assigning the result to the variable SUMMARYFLAGS) for the NODE containing ENTRY by logically ORing the change flags for all entries in NODE (block 652), and then recursively invokes itself for the parent entry of NODE with the new SUMMARYFLAGS (block 654).

Example of Text Creation

Assume for the purposes of this example that a user is editing the document shown in FIG. 2 and decides to create new paragraph 205 between paragraphs 204 and 206. Suppose further that FIG. 3F represents the state of the change flag tree just prior to this operation. The following describes the step-by-step actions taken by TextUnitCreator 165, with the resulting state of the change flag tree shown in FIG. 3G.

The user's request is received and handled by Event Handler 197 in blocks 406 and 408. TextUnitCreator 165 is then initiated in block 408 by Event Handler 197. Following FIG. 4C, TextUnitCreator 165 assigns TEXTPTR to point to new paragraph 205 (block 436). Since the paragraph is not being created at the beginning of the document (block 438), TextUnitCreator 165 sets PREDPTR to point at paragraph 204 (block 442), sets the variable NODE to node 342 (block 446), sets the variable FLAGS to a binary value of 11 (block 448), and initiates the EntryInsertion submechanism (block 450).

In FIG. 4D, the EntryInsertion submechanism discovers that NODE 342 contains 2n-1=3 entries already (block 456), so the EntryInsertion submechanism initiates the ComplexEntryInsertion submechanism (FIG. 4E). The ComplexEntryInsertion submechanism then creates a new node 346 and assigns it to NEWNODE (block 474). Since the PREDPTR to paragraph 204 is one of the last n=2 entries of NODE 342 (block 476), the ComplexEntryInsertion submechanism places the last entry of NODE 342 and a new entry for paragraph 205 (with change flags FLAGS=binary 11) in NEWNODE 346 (block 478). The ComplexEntryInsertion submechanism then calculates the new summary flags for NODE 342 and NEWNODE 346 (block 488) to be binary 10 and 11, respectively. Since NODE 342 is not the root node (block 490), the ComplexEntryInsertion submechanism inserts an entry for NEWNODE 346 into NODEs parent 340 (via the EntryInsertion submechanism shown on FIG. 4D). Node 340 contains less than 2n-1=3 entries (block 456 of FIG. 4D), but there is not an entry free right after the entry for node 342 (block 460 of FIG. 4D); hence, the EntryInsertion submechanism shifts the entry for node 344 to the right to make room for a new entry (block 462). The EntryInsertion submechanism then inserts an entry for node 346 having new summary flags 11 into this space (block 464). Since node 340 is the root node (block 465), the recursive invocation of the EntryInsertion submechanism from block 494 of the ComplexEntryInsertion submechanism (shown at block 494 of FIG. 4E) ends. Since the new summary flags for NODE 342 have not changed (block 496), the ComplexEntryInsertion submechanism returns to the EntryInsertion submechanism in block 500. The EntryInsertion submechanism then returns to TextUnitCreator 165 in block 470. TextUnitCreator 165 then terminates execution in block 452. The resulting hierarchical change flag tree is shown in FIG. 3G.

TextUnitDestroyer

Deleting a text unit is essentially the inverse operation of creating a new text unit. As shown on FIG. 4B, a user's deletion request is received and handled in blocks 410 and 412 of Event Handler 197. FIG. 4F shows that TextUnitDestroyer 170's main task consists of deleting the change flag entry in a leaf node that points to the text unit to be deleted (block 506). TextUnitDestroyer 170 accomplishes this by initiating the recursive EntryRemoval submechanism shown in FIG. 4G.

As shown on FIG. 4G, the EntryRemoval submechanism first removes the change flag entry identified by the variable ENTRY from its containing node, NODE (block 512), and shifts some of NODEs entries left or right as necessary to ensure that all valid entries are contiguous (block 514). Of course this requires updating FirstValid 318 and LastValid 320 in NODEs header 312. If NODE is the root node (block 516), then the EntryRemoval submechanism's task is complete; otherwise, if NODE has at least n entries remaining (block 518), the EntryRemoval submechanism recomputes the summary flags (i.e., as identified by the variable SUMMARYFLAGS) for NODE (block 522) and invokes the EntryFlagModifier2 submechanism (FIG. 4P) to propagate any changes to these flags up the hierarchical change flag tree (block 524).

If, on the other hand, NODE now has less than n entries remaining and is not the root (block 520), the EntryRemoval submechanism restores NODE to a minimum of n entries. The EntryRemoval submechanism accomplishes this by initiating the ComplexEntryRemoval submechanism. As shown on FIG. 4H, if NODE has a neighbor node (as identified by the variable NBR) that has more than n entries (block 530), the ComplexEntryRemoval submechanism redistributes some of NBR's entries into NODE so that both nodes have at least n entries (block 538). In the preferred embodiment, the ComplexEntryRemoval submechanism ensures that NODE and NBR have a roughly equal number of entries as a result. Next, the ComplexEntryRemoval submechanism recomputes the summary flags for NODE and NBR by logically ORing the change flag entries for all valid entries they contain (block 540). If NBR's summary flags have changed in this process (block 542), the ComplexEntryRemoval submechanism initiates the recursive EntryFlagModifier2 submechanism (FIG. 4P) to propagate this information up the tree (block 544). The ComplexEntryRemoval submechanism takes similar actions if NODE's summary flags have changed (blocks 546, 548).

Now, assume instead that NODE does not have a neighbor with more than n entries and that NODE is not the root node (block 530). Then, it is possible to select a neighbor NBR of NODE that has exactly n entries and has the same parent as NODE. The ComplexEntryRemoval submechanism merges all of NBR's entries into NODE, which then has exactly 2n−1 entries (block 532). It also logically ORs NBR's summary flags into those of NODE (block 534). The ComplexEntryRemoval submechanism then recursively removes NBR from its parent node (block 536) using the EntryRemoval submechanism (FIG. 4F). If NODEs summary flags have changed in this process (block 546 of FIG. 4F), then the EntryRemoval submechanism invokes the recursive EntryFlagModifier2 submechanism (FIG. 4O) to propagate this information up the tree (block 548). The ComplexEntryRemoval submechanism then returns to the Entry removal submechanism in block 550 which itself returns to TextUnitDestroyer 170 in block 526. TextUnitDestroyer 170 then terminates execution in block 508.

Example of Text Destruction

Assume for the purposes of this example that, after inserting paragraph 205 as described above, the user editing the document in FIG. 2 decides to delete paragraph 208. Assume further that FIG. 3G represents the state of the change flag tree just prior to this operation. The following describes the step-by-step actions taken by TextUnitDestroyer 170, with the resulting state of the change flag tree shown in FIG. 3H.

As shown on FIG. 4B, the user's deletion request is received and handled in blocks 410 and 412 of Event Handler 197. Following FIG. 4F, TextUnitDestroyer 170 assigns the entry in node 344 for paragraph 208 to the variable ENTRY (block 504). TextUnitDestroyer 170 then uses the EntryRemoval submechanism to remove ENTRY from NODE 344 (block 512, FIG. 4G). The remaining entry is vacuously contiguous, so no action is needed (block 514 of FIG. 4G). NODE 344 is not the root node (block 516), but NODE 344 does not have at least n=2 entries (block 518); hence, the ComplexEntryRemoval submechanism (FIG. 4H) is initiated in block 520.

Since NODE 344 has no neighbors with more than n=2 entries (block 530), NODE 344 acquires all of the entries from a neighbor NBR (node 346) having 2 entries (block 532). Thus NODE 344 now contains entries for paragraphs 205, 206, and 210. The ComplexEntryRemoval submechanism ORs together the summary flags for these entries to produce the new summary flags having binary value 11 for NODE 344 (block 534). Next, the ComplexEntryRemoval submechanism recursively removes NBR 346 from its parent node 340, using the EntryRemoval submechanism (FIG. 4G). Removing this entry causes the entries of node 340 to be non-contiguous, so the EntryRemoval submechanism shifts the entry for node 344 left (block 514). Since node 340 is the root node, the recursive deletion invocation of block 536 (FIG. 4H) ends. Now, since NODE 344's summary flags have changed (block 546) from 00 to 11, the ComplexEntryRemoval submechanism checks whether the modified flags must be propagated up the tree (block 548). Since NODE 344's summary flags reside in the root node, there is no need to further propagate the modified flags. Therefore, the ComplexEntryRemoval and EntryRemoval submechanisms return (blocks 550 and 526) which causes TextUnit Destroyer 170 to terminate execution in block 508. The resulting hierarchical change flag tree is shown in FIG. 3H.

TextUnitModifier

As shown on FIG. 4B, a user's modification request is received and handled in blocks 414 and 416 of Event Handler 197. TextUnitModifier 175 (FIG. 4I) is responsible for handling modifications to incremental units (i.e., text units in this case). When a text unit is modified (by inserting or deleting text within it) all of its change flags must be set. If the change flags are already set, no change to the change flag tree is required. However, if the flags were not previously set, the effects of the changed flags must be propagated up the tree, setting the flags in parent nodes until TextUnitModifier 175 encounters the root or a parent that does not require changes. FIG. 4I shows TextUnitModifer 175 of the present invention. The mechanism consists of locating the ENTRY in a leaf node that points to the modified text unit, assigning FLAGS to be a set of change flags all in the "set" state, and invoking the recursive EntryFlagModifier1 submechanism of FIG. 4J.

As shown on FIG. 4J, the EntryFlagModifier1 submechanism assigns the variable NEWFLAGS to be a set of change flags in which a flag is in the set state if and only if it is set in FLAGS but not set in the change flags for ENTRY. (This is the meaning of "NEWFLAGS=FLAGS−ChgFlags (ENTRY)" in block 564; the "−" symbol here is not subtraction, but set difference.) EntryFlagModifier1 then modifies the change flags for ENTRY to hold the value in FLAGS (block 566). If no flags are set in NEWFLAGS, indicating that summary change flags at higher levels of the tree are already set correctly (block 568), or if ENTRY is in the root node (block 570), EntryFlagModifier1 ends in block 574. Otherwise, EntryFlagModifier1 recursively invokes itself by assigning ENRY to be the parent entry of the node containing ENTRY and leaving FLAGS unchanged (block 572).

Example of Text Modification

Assume for the purposes of this example that, after making the previously discussed modifications, the user editing the document in FIG. 2 decides to modify paragraph 210. Assume further that FIG. 3H represents the state of the change flag tree just prior to this operation. The following describes the step-by-step actions taken by TextUnitModifier 175, with the resulting state of the change flag tree shown in FIG. 3I.

As shown on FIG. 4B, a user's modification request is received and handled in blocks 414 and 416 of Event Handler 197. Following FIG. 4I, TextUnitModifier 175 assigns the entry in node 344 for paragraph 210 to the variable ENTRY (block 554), assigns a binary value of 11 to the variable FLAGS (block 556), and initiates the EntryFlagModifier1 submechanism (FIG. 4J). As shown on FIG. 4J, EntryFlagModifier1 calculates NEWFLAGS to be 11, since FLAGS is 11 and the current change flags for ENTRY are 00 (block 564). The EntryFlagModifier1 submechanism then modifies the change flags in ENTRY to be 11 (block 566). Since NEWFLAGS contains some set flags (block 568) and node 344 is not the root node (block 570), the EntryFlagModifier1 submechanism recursively invokes itself for the summary entry for node 344 in the root node. During this invocation, the EntryFlagModifier1 submechanism calculates NEWFLAGS to be 00, since the current change flags for the summary entry for node 344 are already 11 (block 564). Therefore, setting the current change flags to FLAGS (block 566) does not result in a change. Since no flags are set in NEWFLAGS (block 568), the EntryFlagModifier1 submechanism returns to TextUnitModifer 175 in block 574 which itself terminates execution in block 560. The resulting hierarchical change flag tree is shown on FIG. 3I.

TextUnitCutter, TextUnitCopier, and TextUnitPaster

A feature typically found in word processors is the ability to "cut," "copy," and "paste" blocks of text When a user executes the cut function, the word processor removes the selected text units from the document and stores them in a "cut buffer" in memory. When a user executes the copy function, the word processor places a copy of the selected text units into the cut buffer. Thereafter when a user executes the paste function, the word processor copies the text units from the cut buffer into the document at a location selected by the user. A user may paste a cut or copied section as many times as desired.

At first glance, cut-and-paste might seem to only require a repeated application of TextUnitDestroyer 170 and TextUnitCreator 165. However, when a text unit is moved wholesale, most incremental word-processing functions will not need to be reinvoked for that text unit. For example, moving a paragraph does not require rechecking the spelling of words in that paragraph.

For this reason, the mechanisms to cut and copy text must copy into the cut buffer not only the text, but also the change flag entries for the text. Similarly, the mechanism to paste the cut buffer into the document must insert the change flag entries from the cut buffer into the new locations in the change flag tree, and propagate any set flags up the tree. This design ensures that the moved or copied text units will only be processed at a later time if they would have been processed had they remained at their previous location.

FIG. 4K shows TextUnitCutter 180. TextUnitCutter 180 first copies all affected text units and their change flags to the cut buffer (block 578, FIG. 4L). (This is also the entire TextUnitCopier 185 mechanism for the text-copying function.) TextUnitCutter 180 then invokes the EntryRemoval submechanism (FIG. 4G) for each text unit being cut (blocks 580, 582, 584, 586).

FIG. 4M shows TextUnitPaster 190. TextUnitPaster 190 is responsible for pasting text from the cut buffer into the document. The main activity for this mechanism is the repetitive processing of blocks 602, 604, 606, 608, 610, 612. During the first iteration of this process, TextUnitPaster 190 assigns TEXTPTR to point to the first text unit in the cut buffer (block 598), and assigns PREDPTR to point to the text unit preceding the insertion point (block 600). For all iterations, TextUnitPaster 190 assigns the leaf node that contains an entry for the text unit identified by the pointer PREDPTR to the variable NODE (block 602) and assigns the variable FLAGS to be the change flags for TEXTPTR's text unit (block 604). TextUnitPaster 190 then invokes the EntryInsertion mechanism (FIG. 4D) to insert the entry for TEXTPTR and FLAGS into NODE following the entry for PREDPTR (block 606). During additional iterations after the first (block 608), TextUnitPaster assigns to PREDPTR the previous value of TEXTPTR (block 610) and assigns TEXTPTR to point to the next text unit in the buffer (block 612).

IncrementalProcessor

FIG. 4N shows the inner workings of IncrementalProcessor 195 of the present invention. IncrementalProcessor 195 is initiated whenever a user selects an incremental word-processing function (e.g., hyphenation or spell checking in this case). IncrementalProcessor 195 first examines the relevant change flag for the selected function in each entry of the root node (blocks 618, 620), using the recursive OptionalNodeProcessor submechanism shown in FIG. 4O. As shown, the OptionalNodeProcessor submechanism assigns the variable ENTRY to be the first entry in the node (i.e., as identified by the variable NODE) being processed (block 626). If the relevant flag for the given word-processing function is not set in ENTRY (block 628), the OptionalNodeProcessor submechanism continues the process with the next ENTRY (blocks 636, 638). Otherwise if the relevant flag is set, the OptionalNodeProcessor submechanism clears the flag to indicate that the incremental function has been performed for this entry (block 629). Then, if the node is not a leaf, the OptionalNodeProcessor submechanism invokes itself recursively for the node associated with ENTRY (block 632), after which the process continues with the next ENTRY (blocks 636, 638). If the flag is set and NODE is a leaf, then and only then does the OptionalNodeProcessor submechanism perform the word-processing function for the text unit associated with ENTRY (block 634). Again, the process then continues with the next ENTRY (blocks 636, 638).

Example of Incremental Processing

Assume for the purposes of this example that, after making the previously discussed modifications, the user editing the document in FIG. 2 decides to hyphenate the document through the use of a hyphenation function.

Assume further that FIG. 3I represents the state of the change flag tree just prior to this operation. The following describes the step-by-step actions taken by IncrementalProcessor 195, with the resulting state of the change flag tree shown in FIG. 3J.

Following FIG. 4N, IncrementalProcessor 195 sets FLAGNUM to 2 (since the second flag represents the state of the document with respect to hyphenation). As shown in FIG. 4O, the OptionalNodeProcessor submechanism sets ENTRY to be the first entry in the root, that is, the entry for node 342 (block 626). Since FLAGNUM 2 is not set in this entry (block 628), the OptionalNodeProcessor submechanism sets ENTRY to the next entry in the root, that is, the entry for node 344 (blocks 636, 638). Since FLAGNUM 2 is set in this entry, the OptionalNodeProcessor submechanism clears this flag (block 629). Then since NODE 340 is not a leaf, the OptionalNodeProcessor submechanism invokes itself recursively for NODE 344 (block 632).

In this recursive invocation, the OptionalNodeProcessor submechanism sets ENTRY to the first entry in NODE 344, that is, the entry for paragraph 205 (block 626). Since FLAGNUM 2 is set in this entry (block 628), the OptionalNodeProcessor submechanism clears this flag (block 629). Then, since NODE 344 is a leaf (block 630), the OptionalNodeProcessor submechanism hyphenates paragraph 205 (block 634). The OptionalNodeProcessor submechanism next sets ENTRY to the entry for paragraph 206 (blocks 636, 638). Since FLAGNUM 2 is not set in this entry (block 628), the OptionalNodeProcessor submechanism next sets ENTRY to the entry for paragraph 210 (blocks 636, 638). Since FLAGNUM 2 is set in this entry (block 628), the OptionalNodeProcessor submechanism clears this flag (block 629). Then, since NODE 344 is a leaf (block 630), the OptionalNodeProcessor submechanism hyphenates paragraph 210 (block 634). Since there are no more entries in NODE 344 (block 636), the recursive invocation terminates. Further, since there are no more entries in NODE 340, the invocation for the root node terminates as well. Note that the only paragraphs that were hyphenated were paragraph 205 (which was created since the last hyphenation) and paragraph 210 (which was modified since the last hyphenation). Unmodified paragraphs 202, 204, and 206 were not rehyphenated. The resulting hierarchical change flag tree is shown in FIG. 3J. Note also that only the flag for hyphenation was cleared; paragraphs 202, 205, and 210 are still marked as requiring spell-checking.

Performance Notes

It is possible to mathematically demonstrate that the mechanisms described herein are extremely efficient even for very large presented objects, and thus that incorporating these mechanisms into presented object editors is highly practical. Detailed proofs of these mathematical assertions are beyond the scope of this discussion, but the results are summarized here.

As before, let m=2n−1 represent the number of entries in one node of the change flags tree. Also, let U represent the number of incremental units in the presented object, and let M represent the number of these incremental units that have been modified since the last time a given incremental processing function has been performed. Then an upper bound for the worst-case processing time required for each of the major mechanisms is as follows:

| TextUnitCreator | $O(\log_m U)$ |
|---|---|
| TextUnitDestroyer | $O(\log_m U)$ |
| TextUnitModifier | $O(\log_m U)$ |
| IncrementalProcessor | $O(M)$ |

In the above table, the symbol "O" may be thought of as meaning "on the order of" or "proportional to," and indicates that the expression within the parentheses represents an upper bound (within a constant factor) on the amount of time required to perform the associated function in the worst case. Those skilled in the art are presumed to be familiar with the strict mathematical definition of "O". It should be emphasized that the expressions above are worst-case time bounds; on average, the time required for all mechanisms except IncrementalProcessor is a small constant, regardless of the number of incremental units.

In order to minimize this running time of those functions whose worst-case running time is $O(\log_m U)$, the value of m should be chosen large enough that $\log_m U$ grows very slowly with respect to U, but small enough that the time required to scan the entries in one node is not prohibitive. A reasonable choice is to select n=50 and m=99. Assuming these values, consider what happens when text units are incrementally added to a document. After 99 text units have been entered, there is one full node. When the 100th text unit is entered, this node is split into two nodes having 50 valid entries each, and a new root node is added. After 50 more text units have been entered the second leaf node must again be split into two text units having 50 valid entries each. Proceeding in this manner, the reader can see that the height of the tree will remain 1 until the 5000th text unit has been entered. A tree of height 2 will suffice for up to 250,000 text units. Thus the amount of time required by the mechanisms of the preferred embodiment is very small, even for extremely large documents.

It should also be noted that all information necessary to perform incremental processing is present in the leaves of the change flags tree. The purpose of the upper levels of the tree is to speed access to the modified portions of large documents. It is certainly possible to modify the preferred embodiment to remove these upper levels, resulting in a simpler implementation but requiring linear search of the leaves. (That is, it would be possible to perform incremental processing of a document by examining the change flags in all leaf nodes and processing just those incremental units that need to be processed.) This might be appropriate for an implementation that is concerned only with reasonably small viewable objects; but for large objects, the linear search (requiring O(U) time in both the worst case and the average case) is impractical. The claims of the present invention apply equally regardless of whether the upper levels of the change flag tree are implemented.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A word processor for processing a document, said document containing a first paragraph and a second paragraph, said word processor comprising:

a spell checker, said spell checker being used to check whether words contained in said document are spelled correctly, said spell checker automatically only checking whether words in said first paragraph are spelled correctly after only said first paragraph has been changed, said spell checker not checking whether words in said second paragraph are spelled correctly after only said first paragraph has been changed.

2. A word processor for processing a document, said document containing a first paragraph and a second paragraph, said word processor comprising:
   a style checker, said style checker being used to check whether said document is grammatically correct, said style checker automatically only checking whether said first paragraph is grammatically correct after only said first paragraph has been changed, said style checker not checking whether said second paragraph is grammatically correct after only said first paragraph has been changed.

3. A word processor for processing a document, said document containing a first incremental unit and a second incremental unit, said word processor comprising:
   a spell checker, said spell checker being used to check whether words contained in said document are spelled correctly, said spell checker automatically only checking whether words in said first incremental unit are spelled correctly after only said first incremental unit has been changed, said spell checker not checking whether words in said second incremental unit are spelled correctly after only said first incremental unit has been changed.

4. The word processor of claim 3 wherein said first incremental unit and said second incremental unit are words.

5. The word processor of claim 3 wherein said first incremental unit and said second incremental unit are sentences.

6. A presented object processor for processing a document, said document containing a first paragraph and a second paragraph, said presented object processor comprising:
   a spell checker, said spell checker being used to check whether words contained in said document are spelled correctly, said spell checker automatically only checking whether words in said first paragraph are spelled correctly after only said first paragraph has been changed, said spell checker not checking whether words in said second paragraph are spelled correctly after only said first paragraph has been changed.

7. A presented object processor for processing a document, said document containing a first incremental unit and a second incremental unit, said presented object processor comprising:
   a spell checker, said spell checker being used to check whether words contained in said document are spelled correctly, said spell checker automatically only checking whether words in said first incremental unit are spelled correctly after only said first incremental unit has been changed, said spell checker not checking whether words in said second incremental unit are spelled correctly after only said first incremental unit has been changed.

8. The presented object processor of claim 7 wherein said first incremental unit and said second incremental unit are words.

9. The presented processor of claim 7 wherein said first incremental unit and said second incremental unit are sentences.

10. A computer-implemented method for spell checking within a presented object, said presented object containing at least two incremental units, said method comprising the steps of:
    determining that an incremental unit within said presented object has changed; and
    checking the spelling of only said incremental unit that has changed.

11. The method of claim 10 wherein said incremental unit is a paragraph.

12. The method of claim 10 wherein said incremental unit is a sentence.

13. The method of claim 10 wherein said incremental unit is a word.

14. The method of claim 10 wherein said presented object is a document.

15. The method of claim 10 wherein said presented object is a drawing.

16. A computer-implemented method for spell checking within a document, said document containing at least two paragraphs, said method comprising the steps of:
    determining that a paragraph within said document has changed; and
    checking only the spelling of words that are contained in said paragraph that has changed.

17. A computer-implemented method for spell checking within a drawing, said drawing containing at least two incremental units that are of the same type, said method comprising the steps of:
    determining that an incremental unit within said document has changed; and
    checking the spelling of only said incremental unit that has changed, said incremental unit that has changed being one of said two incremental units of the same type.

18. The method of claim 17 wherein said incremental unit is a paragraph.

19. The method of claim 17 wherein said incremental unit is a sentence.

20. The method of claim 17 wherein said incremental unit is a word.

21. A computer-implemented method for style checking within a presented object, said presented object containing at least two incremental units, said method comprising the steps of:
    determining that an incremental unit within said presented object has changed; and
    checking the grammar of only said incremental unit that has changed.

22. The method of claim 21 wherein said incremental unit is a paragraph.

23. The method of claim 21 wherein said incremental unit is a sentence.

24. A computer-implemented method within a word processor for spell checking a document, said document being operated upon by said word processor, said method comprising:
    receiving a first request from a user to check whether words contained in said document are spelled correctly;
    checking whether said words are spelled correctly;
    receiving a second request from said user to check whether words contained in said document are spelled correctly;
    determining whether one or more incremental units within said document have been changed since said first request was received from said user; and checking only those of said words that are contained within said one or more incremental units for spelling correctness when it is determined in said determining step that said one or more incremental units have been changed since said first request was received from said user.

25. The method of claim 24 wherein said incremental units are each sentences.

26. The method of claim 24 wherein said incremental units are each words.

27. The method of claim 24 wherein said incremental units are each paragraphs.

28. A computer-implemented method for spell checking a document, said method comprising:

receiving a first request from a user to check whether words contained in said document are spelled correctly;

checking whether said words are spelled correctly;

receiving a second request from said user to check whether words contained in said document are spelled correctly;

determining whether one or more incremental units within said document have been changed since said first request was received from said user; and checking only those of said words that are contained within said one or more incremental units for spelling correctness when it is determined in said determining step that said one or more incremental units have been changed since said first request was received from said user, said checking step not involving incremental units within said document that have not changed since said first request was received from said user.

29. The method of claim 28 wherein said incremental units are each sentences.

30. The method of claim 28 wherein said incremental units are each words.

31. The method of claim 28 wherein said incremental units are each paragraphs.

32. A computer-implemented method within a word processor for style checking a document, said document being operated upon by said word processor, said method comprising:

receiving a first request from a user to check grammar in said document;

checking grammar in said document;

receiving a second request from a user to check grammar in said document;

determining whether one or more incremental units within said document have been changed since said first request was received from said user; and checking only said one or more incremental units for correctness of grammar when it is determined in said determining step that said one or more incremental units have been changed since said first request was received from said user, said checking step not involving incremental units within said document that have not changed since said first request was received from said user.

33. The method of claim 32 wherein said incremental units are each sentences.

34. The method of claim 32 wherein said incremental units are each paragraphs.

35. A program product, said program product comprising:

a word processor for processing a document, said document containing a first paragraph and a second paragraph, said word processor further comprising a spell checker, said spell checker being used to check whether words contained in said document are spelled correctly, said spell checker automatically only checking whether words in said first paragraph are spelled correctly after only said first paragraph has been changed, said spell checker not checking whether words in said second paragraph are spelled correctly after only said first paragraph has been changed; and signal bearing media bearing said program product.

36. A program product, said program product comprising:

a word processor for spell checking a document, said document being operated upon by said word processor, said word processor being configured to execute the steps of:

receiving a first request from a user to check whether words contained in said document are spelled correctly;

checking whether said words are spelled correctly;

receiving a second request from said user to check whether words contained in said document are spelled correctly;

determining whether one or more incremental units within said document have been changed since said first request was received from said user; and checking only those of said words that are contained within said one or more incremental units for spelling correctness when it is determined in said determining step that said one or more incremental units have been changed since said first request was received from said user; and signal bearing media bearing said word processor.

37. The program product of claim 36 wherein said incremental units are each sentences.

38. The program product of claim 36 wherein said incremental units are each words.

39. The program product of claim 36 wherein said incremental units are each paragraphs.

40. A program product, said program product comprising:

a word processor for style checking a document, said document being operated upon by said word processor, said word processor being configured to execute the steps of:

receiving a first request from a user to check grammar in said document;

checking grammar in said document;

receiving a second request from a user to check grammar in said document;

determining whether one or more incremental units within said document have been changed since said first request was received from said user; and checking only said one or more incremental units for correctness of grammar when it is determined in said determining step that said one or more incremental units have been changed since said first request was received from said user, said checking step not involving incremental units within said document that have not changed since said first request was received from said user; and signal bearing media bearing said program product.

41. The program product of claim 40 wherein said incremental units are each sentences.

42. The program product of claim 40 wherein said incremental units are each paragraphs.

* * * * *